United States Patent
Asai et al.

(10) Patent No.: US 10,626,985 B2
(45) Date of Patent: *Apr. 21, 2020

(54) HYDRAULIC CONTROL DEVICE FOR AUTOMATIC TRANSMISSION

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Kazuharu Asai, Nagoya (JP); Makoto Sawada, Nissin (JP); Kyohei Suzumura, Nagoya (JP); Mitsuhiro Fukao, Toyota (JP); Kenichi Tsuchida, Nishio (JP); Yoshimitsu Hyodo, Nishio (JP); Toshiaki Hayashi, Toyohashi (JP); Fumiaki Aikawa, Anjo (JP); Yuta Seriguchi, Anjo (JP); Syuji Moriyama, Nagakute (JP); Yoshinobu Soga, Toyota (JP); Hiromitsu Nitani, Okazaki (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 11 days.

This patent is subject to a terminal disclaimer.

(21) Appl. No.: 15/774,101

(22) PCT Filed: Nov. 21, 2016

(86) PCT No.: PCT/JP2016/084389
§ 371 (c)(1),
(2) Date: May 7, 2018

(87) PCT Pub. No.: WO2017/098898
PCT Pub. Date: Jun. 15, 2017

(65) Prior Publication Data
US 2018/0313444 A1 Nov. 1, 2018

(30) Foreign Application Priority Data

Dec. 9, 2015 (JP) .................................. 2015-239840
Dec. 9, 2015 (JP) .................................. 2015-239841

(51) Int. Cl.
*F16H 61/70* (2006.01)
*F16H 61/00* (2006.01)
(Continued)

(52) U.S. Cl.
CPC ........... *F16H 61/08* (2013.01); *F16H 37/022* (2013.01); *F16H 37/0846* (2013.01);
(Continued)

(58) Field of Classification Search
CPC .............. F16H 61/702; F16H 61/0021; F16H 61/0206; F16H 61/0267
See application file for complete search history.

(56) References Cited

U.S. PATENT DOCUMENTS 4,955,260 A 9/1990 Oshidari
4,984,486 A * 1/1991 Takada ................ F16H 61/0206
477/126
(Continued)

FOREIGN PATENT DOCUMENTS

CN 1779295 A 5/2006
JP H10-252875 A 9/1998
(Continued)

OTHER PUBLICATIONS

Feb. 14, 2017 International Search Report issued in Patent Application No. PCT/JP2016/084389.
(Continued)

*Primary Examiner* — Tisha D Lewis
(74) *Attorney, Agent, or Firm* — Oliff PLC

(57) ABSTRACT

A hydraulic control device that includes a second solenoid valve that is capable of supplying a resisting pressure that
(Continued)

maintains the switching valve in the non-reverse state against the reverse range pressure, wherein the switching valve is maintained in the non-reverse state by supplying the resisting pressure from the second solenoid valve while a travel range is switched to at least a reverse range during forward travel.

17 Claims, 18 Drawing Sheets

(51) Int. Cl.
    *F16H 61/02*     (2006.01)
    *F16H 61/08*     (2006.01)
    *F16H 37/02*     (2006.01)
    *F16H 61/662*     (2006.01)
    *F16H 37/08*     (2006.01)
    *F16H 61/686*     (2006.01)
    *F16H 61/66*     (2006.01)

(52) U.S. Cl.
    CPC ..... *F16H 61/0021* (2013.01); *F16H 61/0267* (2013.01); *F16H 61/662* (2013.01); *F16H 61/686* (2013.01); *F16H 61/702* (2013.01); *F16H 2037/0873* (2013.01); *F16H 2061/6614* (2013.01); *Y02T 10/76* (2013.01)

(56) References Cited

U.S. PATENT DOCUMENTS

| | | | |
|---|---|---|---|
| 5,157,993 A | 10/1992 | Abo | |
| 5,194,052 A | 3/1993 | Ueda et al. | |
| 5,935,039 A | 8/1999 | Sakai et al. | |
| 5,980,420 A | 11/1999 | Sakamoto et al. | |
| 6,030,311 A | 2/2000 | Osumi | |
| 6,063,002 A | 5/2000 | Nobumoto et al. | |
| 6,206,802 B1* | 3/2001 | Kim | F16H 61/0206 475/127 |
| 6,358,179 B1 | 3/2002 | Sakai et al. | |
| 6,436,001 B1 | 8/2002 | Sakai et al. | |
| 6,932,739 B2 | 8/2005 | Miyata et al. | |
| 7,736,270 B2* | 6/2010 | Gierer | F16D 48/0206 477/159 |
| 9,523,417 B2 | 12/2016 | Nakagawa et al. | |
| 2006/0111207 A1 | 5/2006 | Ogata et al. | |
| 2008/0236917 A1 | 10/2008 | Abe et al. | |
| 2010/0081546 A1* | 4/2010 | Yoshioka | F16H 61/0206 477/131 |
| 2010/0126816 A1* | 5/2010 | Takei | F16H 61/143 192/3.29 |
| 2015/0087463 A1 | 3/2015 | Nakagawa et al. | |
| 2016/0305520 A1 | 10/2016 | Walter | |

FOREIGN PATENT DOCUMENTS

| | | |
|---|---|---|
| JP | 2001-050387 A | 2/2001 |
| JP | 2001-099295 A | 4/2001 |
| JP | 2001-214966 A | 8/2001 |
| JP | 2015-218899 A | 12/2015 |
| WO | 2013/0176208 A1 | 11/2013 |
| WO | 2015/086018 A2 | 6/2015 |
| WO | 2015/146601 A1 | 10/2015 |
| WO | 2016/013441 A1 | 1/2016 |

OTHER PUBLICATIONS

Oct. 13, 2015 Search Report issued in International Patent Application No. PCT/JP2015/070090.

Sep. 13, 2019 Notice of Allowance issued in U.S. Appl. No. 15/322,028.

U.S. Appl. No. 15/322,028, filed Dec. 23, 2016 in the name of Tsuchida et al.

Jan. 7, 2020 Notice of Allowance issued in U.S. Appl. No. 15/322,028.

\* cited by examiner

FIG.2

| direction | mode | C1 | C2 | D1 | B1 |
|---|---|---|---|---|---|
| Fw(D) | Fixed shift | ○ | | ○ | |
| | Variable shift | | ○ | (○) | |
| Rev(R) | Fixed shift | | | ○ | ○ |

HYDRAULIC CONTROL DEVICE FOR AUTOMATIC TRANSMISSION

BACKGROUND

The present disclosure relates to a hydraulic control device for an automatic transmission that is suitable to be mounted on a vehicle or the like.

Automatic transmissions that use a belt-type continuously variable speed change mechanism that includes a pair of pulleys and a belt (or a chain) wound around the pulleys and made of metal and that continuously varies a speed by changing the effective diameters of the pulleys have been widespread as automatic transmissions that are suitable for use in vehicles, for example. There have also been known automatic transmissions that use a toroidal-type continuously variable speed change mechanism or a cone-ring-type continuously variable speed change mechanism, besides the belt-type continuously variable speed change mechanism.

There has further been developed an automatic transmission that has two parallel power transfer paths, namely a first power transfer path that couples an input shaft and an output shaft to each other via a forward/reverse switching device and a second power transfer path that couples the input shaft and the output shaft to each other via a continuously variable speed change mechanism (see WO 2013/176208). In the automatic transmission, the forward/reverse switching device has a first clutch to be engaged only during forward travel and a brake to be engaged only during reverse travel, a meshing clutch with a synchronization mesh mechanism (hereinafter referred to as a "meshing clutch") is provided in the first power transfer path, and a second clutch is provided in the second power transfer path.

In the automatic transmission, when the vehicle starts to travel in the forward direction or when the vehicle travels forward at a speed that is less than a predetermined speed, a forward non-continuously-variable mode in which the vehicle travels using a low forward speed without performing continuously variable speed change with the first clutch and the meshing clutch in the engaged state and with the second clutch in the disengaged state is entered so that drive torque from a drive source is transferred from the input shaft to the output shaft through the first power transfer path. When the vehicle travels forward at a speed that is not less than the predetermined speed, meanwhile, a forward continuously-variable mode in which the second clutch is in the engaged state and in which the first clutch and the meshing clutch are in the disengaged state is entered so that drive torque from the drive source is transferred from the input shaft to the output shaft through the second power transfer path. When the vehicle travels in reverse, further, a reverse non-continuously-variable mode in which the brake and the meshing clutch are in the engaged state and in which the first clutch and the second clutch are in the disengaged state is entered so that drive torque from the drive source is transferred from the input shaft to the output shaft through the first power transfer path.

In the automatic transmission, in addition, in the case where a shift lever is switched to a reverse range during forward travel at a predetermined speed or more, control is performed so as not to engage the brake not to establish a reverse speed, in order to protect a power transfer mechanism.

SUMMARY

However, the automatic transmission described in WO 2013/176208 includes four engagement elements, namely the first clutch, the second clutch, the meshing clutch, and the brake, and the engagement elements are actuated by a hydraulic control device. In normal hydraulic control devices, one solenoid valve such as a linear solenoid valve is provided for each engagement element. Therefore, four solenoid valves are provided in order to control the four engagement elements discussed above.

Here, it is conceivable to control a plurality of engagement elements by distributing a supplied pressure and a line pressure (or a modulator pressure) from one solenoid valve using a switching valve. With this configuration, the number of the solenoid valves can be reduced to be less than the number of the engagement elements.

However, in the case where the shift lever is switched to the reverse range during forward travel at a predetermined speed or more, for example, and particularly in the case where a manual valve is used, there may occur variations in the time lag between the timings of mechanical switching of a spool of the manual valve and electrical switching of a position sensor when the shift lever is switched to the reverse range. In this case, the meshing clutch which should be kept engaged may be disengaged when the switching valve is switched to the reverse range, and a shock or noise may be caused in order to re-engage the meshing clutch. Alternatively, the brake may be abruptly engaged along with switching of the switching valve, and a shock may be caused when the brake is abruptly engaged.

An exemplary aspect of the disclosure provides a hydraulic control device for an automatic transmission that can suppress disengagement of a meshing clutch with a synchronization mesh mechanism or abrupt engagement of an engagement element in the case where a shift lever is switched to a reverse range during forward travel while reducing the number of solenoid valves.

The present disclosure provides a hydraulic control device for an automatic transmission including: an input shaft drivably coupled to a drive source of a vehicle; an output shaft drivably coupled to wheels; a power transfer path that couples the input shaft and the output shaft to each other; a meshing clutch with a synchronization mesh mechanism that is provided in the power transfer path and that allows power transfer when supplied with a hydraulic pressure; and an engagement element that is provided in the power transfer path and that allows power transfer with rotation from the input shaft reversed when supplied with a hydraulic pressure, the automatic transmission being configured to transfer rotation by connecting the input shaft and the output shaft to each other through the power transfer path when the meshing clutch and the engagement element are brought into an engaged state, and the hydraulic control device being configured to supply and discharge a hydraulic pressure to and from the meshing clutch and the engagement element. The hydraulic control device includes: a source pressure generator that generates a source pressure; a range pressure supplier that supplies a reverse range pressure in the case where a shift speed is a reverse speed; a first solenoid valve that is capable of supplying an engagement pressure for engagement of the meshing clutch or the engagement element; a switching valve that is switchable in accordance with the reverse range pressure, the switching valve being switched to a non-reverse state in which the engagement pressure which is supplied from the first solenoid valve is supplied to the meshing clutch and a hydraulic pressure in the engagement element is drained in the case where the reverse range pressure is not supplied, and switched to a reverse state in which the engagement pressure which is supplied from the first solenoid valve is supplied to the engagement element and the source pressure is supplied to the meshing clutch in the case where the reverse range pressure is supplied; and a second solenoid valve that is capable of supplying a resisting pressure that maintains the switching valve in the non-reverse state against the reverse range pressure, in which the switching valve is maintained in the non-reverse state by supplying the resisting pressure from the second solenoid valve while a travel range is switched to at least a reverse range during forward travel.

With the present hydraulic control device for an automatic transmission, the switching valve can be maintained in the non-reverse state by supplying the resisting pressure from the second solenoid valve while the travel range is switched to at least the reverse range during forward travel. Therefore, the engagement pressure which is supplied from the first solenoid valve is supplied to the meshing clutch, and a hydraulic pressure in the engagement element is drained. Thus, disengagement of the meshing clutch and abrupt engagement of the engagement element can be suppressed in the case where the shift lever is switched to the reverse range during forward travel.

BRIEF DESCRIPTION OF THE DRAWINGS

FIG. 2 is an engagement table of the automatic transmission according to the embodiment.

DETAILED DESCRIPTION OF EMBODIMENTS

Figure 1:
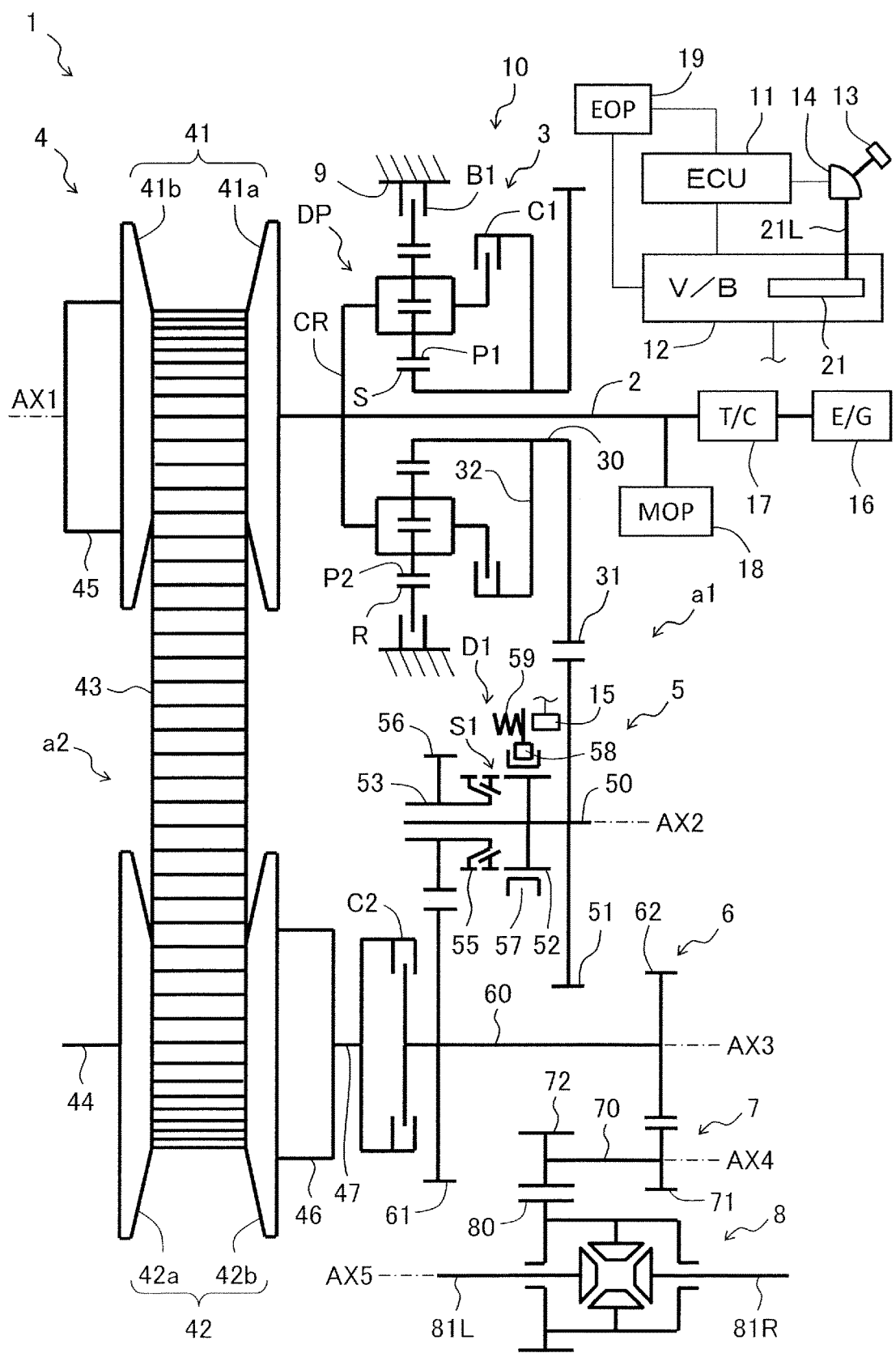
FIG. 1 is a skeleton diagram illustrating an automatic transmission according to an embodiment.

A hydraulic control device 12 for an automatic transmission 10 according to an embodiment will be described below with reference to FIGS. 1 to 14B. The term "drivably coupled" as used herein refers to a state in which rotary elements are coupled to each other in such a way as to allow transfer of a drive force, which includes a state in Which the rotary elements are coupled to each other so as to rotate together with each other, and a state in which the rotary elements are coupled to each other via a clutch or the like in such a way as to allow transfer of a drive force.

A schematic configuration of a vehicle 1 that includes the automatic transmission 10 according to the present embodiment will be described with reference to FIG. 1. The vehicle 1 includes an internal combustion engine (drive source) 16, the automatic transmission 10, a control device (ECU) 11, and the hydraulic control device (V/B) 12.

The automatic transmission 10 includes a torque converter 17, a forward/reverse switching device 3 that has an input shaft 2, a continuously variable speed change mechanism 4, a speed reduction gear mechanism 5, an output gear portion 6 that has an output shaft 60, a counter shaft portion 7, a differential device 8, a transmission case 9 that houses such components, a mechanical oil pump (MOP) 18, and an electric oil pump (EOP) 19. The automatic transmission 10 also includes power transfer paths a1 and a2 that couple the input shaft 2 and the output shaft 60 to each other. The power transfer paths a1 and a2 include: a first power transfer path a1 in which a meshing clutch D1 and a brake B1 to be discussed later are provided and through which the input shaft 2 and the output shaft 60 can be coupled to each other during forward travel and reverse travel; and a second power transfer path a2 which is a different path from the first power transfer path a1 and through which the input shaft 2 and the output shaft 60 can be coupled to each other during forward travel. In addition, the automatic transmission 10 includes axes that are parallel to each other, namely a first axis AX1 to a fifth axis AX5.

The first axis AX1 is coaxial with a crankshaft of the internal combustion engine 16. An input shaft (not illustrated) of the automatic transmission 10 coupled to the crankshaft, the torque converter 17, the input shaft 2 of the forward/reverse switching device 3 and the continuously variable speed change mechanism 4, a planetary gear DP of the forward/reverse switching device 3, a first clutch (forward engagement element) C1, a brake (reverse engagement element, engagement element) B1, and a primary pulley 41 of the continuously variable speed change mechanism 4 are disposed on the first axis AX1. That is, the input shaft 2 is drivably coupled to the internal combustion engine 16 of the vehicle 1.

The speed reduction gear mechanism 5 is disposed on the second axis AX2. A secondary pulley 42 of the continuously variable speed change mechanism 4, a second clutch C2, and the output gear portion 6 are disposed on the third axis AX3. The counter shaft portion 7 is disposed on the fourth axis AX4. The differential device 8 and left and right drive shafts 81L and 81R are disposed on the fifth axis AX5.

The input shaft of the automatic transmission 10, which is coupled to the crankshaft, is coupled to the input shaft 2 of the forward/reverse switching device 3 and the continuously variable speed change mechanism 4 via the torque converter 17. The forward/reverse switching device 3 includes the planetary gear DP, the brake B1, and the first clutch C1, and is configured for transfer with the rotational direction switched in accordance with the travel direction of the vehicle 1. The input shaft 2 passes through the inner peripheral side of the planetary gear DP to be connected to the primary pulley 41 of the continuously variable speed change mechanism 4, and to be connected to a carrier CR of the planetary gear DP. The planetary gear DP is constituted of a so-called double-pinion planetary gear that has a sun gear S, a ring gear R, and the carrier CR which rotatably supports a pinion P1 meshed with the sun gear S and a pinion P2 meshed with the ring gear R. Rotation of the ring gear R with respect to the transmission case 9 can be locked by the brake B1 in addition, the sun gear S is directly coupled to a hollow shaft 30, the carrier CR is connected to the hollow shaft 30 via the first clutch C1, and the hollow shaft 30 is coupled to a forward/reverse rotation output gear 31. The hollow shaft 30 is also coupled to a clutch drum 32 of the first clutch C1. The forward/reverse rotation output gear 31, the hollow shaft 30, and the clutch drum 32 integrally constitute a rotary member.

The first clutch C1 forms a path for transferring rotation in the forward direction of the vehicle 1 when the first clutch C1 is engaged. The brake B1 forms a path for transferring rotation in the reverse direction of the vehicle 1 when the brake B1 is engaged. The forward/reverse rotation output gear 31 is meshed with an input gear 51 of the speed reduction gear mechanism 5. The brake B1 is provided in the first power transfer path a1, and configured to allow power transfer with rotation from the input shaft reversed when a hydraulic pressure is supplied.

The speed reduction gear mechanism 5 includes: a first rotary shaft 50 disposed on the second axis AX2; the input gear 51 which is provided on the first rotary shaft 50; the meshing clutch (meshing clutch with a synchronization mesh mechanism) D1 which is provided on the first rotary shaft 50 and provided in the first power transfer path a1; and a second rotary shaft 53 and an output gear 56 constituted of a hollow shaft that is relatively rotatable with respect to the first rotary shaft 50. The input gear 51 is integrally fixed and coupled to one side of the first rotary shaft 50. The second rotary shaft 53 is supported on the outer peripheral side of the other side of the first rotary shaft 50 so as to be relatively rotatable through a needle bearing (not illustrated), for example. That is, the second rotary shaft 53 is disposed as a double shaft that overlaps the first rotary shaft 50 in the axial direction. The output gear 56 is integrally fixed and coupled to the second rotary shaft 53. The output gear 56 is meshed with an input gear 61 of the output gear portion 6.

The meshing clutch D1 includes a drive gear 52, a driven gear 55, a synchronization mesh mechanism S1 (synchronizer), a sleeve 57, a shift fork 58, an urging spring (urging portion) 59, and a synchronization detection section 15, and can engage and disengage the first rotary shaft 50 and the second rotary shaft 53 with and from each other. The meshing clutch 171 is provided in the first power transfer path a1, and configured to allow power transfer when a hydraulic pressure is supplied.

The drive gear 52 is smaller in diameter than the input gear 51, and is integrally fixed and coupled to one side of the first rotary shaft 50. The driven gear 55 is the same in diameter as the drive gear 52 and smaller in diameter than the output gear 56, and is integrally fixed and coupled to the second rotary shaft 53. The synchronization mesh mechanism S1 is disposed on the drive gear 52 side of the driven gear 55, and works as a synchronization mechanism that synchronizes rotations when the drive gear 52 and the driven gear 55 are fitted with each other. A publicly known or new appropriate mechanism can be used as the synchronization mesh mechanism S1, and thus the synchronization mesh mechanism S1 will not be described in detail.

A tooth surface is formed on the inner peripheral surface of the sleeve 57. The sleeve 57 is disposed on the outer peripheral side of the drive gear 52 and the driven gear 55 so as to be movable in the axial direction. The sleeve 57 is driven to be moved in the axial direction by the shift fork 58 which is driven by a hydraulic servo 93 (see FIG. 3) to be discussed later to be driven to be slid between a position at which the sleeve 57 is meshed with only the drive gear 52 and a position at which the sleeve 57 is meshed with both the drive gear 52 and the driven gear 55. Consequently, the drive gear 52 and the driven gear 55 can be switched between the disengaged state (disconnected state) and the engaged state (drivably coupled state).

The urging spring 59 applies an urging force to the shift fork 58 in the direction in which the drive gear 52 and the driven gear 55 are brought into the disengaged state. Therefore, when an engagement pressure PSLG or a modulator pressure $P_{LPM2}$ is supplied to the hydraulic servo 93, the hydraulic servo 93 moves the shift fork 58 against the urging force of the urging spring 59 so as to bring the drive gear 52 and the driven gear 55 into the engaged state. When a hydraulic pressure is drained from the hydraulic servo 93, meanwhile, the urging spring 59 moves the shift fork 58 so as to bring the drive gear 52 and the driven gear 55 into the disengaged state. That is, the meshing clutch D1 is maintained in the engaged state (actuated state) when the engagement pressure PSLG or the modulator pressure $P_{LPM2}$ is supplied, and the urging spring 59 switches the meshing clutch D1 into the disengaged state when the engagement pressure PSLG or the modulator pressure $P_{LPM2}$ is not supplied.

The synchronization detection section 15 detects whether or not the meshing clutch D1 is in the engaged state, and transmits the detection result to the ECU 11. A sensor, a switch, or the like that detects movement of a movable member of the hydraulic servo 93 or a movable member such as the shift fork 58 and the sleeve 57, for example, can be applied as the synchronization detection section 15.

The continuously variable speed change mechanism 4 can continuously change the speed ratio. In the present embodiment, a belt-type automatic continuously variable speed change mechanism is applied as the continuously variable speed change mechanism 4. It should be noted, however, that the present disclosure is not limited thereto, and a toroidal-type continuously variable speed change mechanism or a cone-ring-type continuously variable speed change mechanism, for example, may be applied as the continuously variable speed change mechanism 4. The continuously variable speed change mechanism 4 is configured to include: the primary pulley 41 which is connected to the input shaft 2; the secondary pulley 42; and an endless belt 43 wound around the primary pulley 41 and the secondary pulley 42. The primary pulley 41 has a fixed sheave 41a and a movable sheave 41b that have respective wall surfaces formed in a conical shape so as to face each other, the fixed sheave 41a being fixed so as to be immovable in the axial direction with respect to the input shaft 2, and the movable sheave 41b being supported so as to be movable in the axial direction with respect to the input shaft 2. The belt 43 is held by a groove portion with a V-shape in section formed by the fixed sheave 41a and the movable sheave 41b.

Similarly, the secondary pulley 42 has a fixed sheave 42a and a movable sheave 42b that have respective wall surfaces formed in a conical shape so as to face each other, the fixed sheave 42a being fixed so as to be immovable in the axial direction with respect to a center shaft 44, and the movable sheave 42b being supported so as to be movable in the axial direction with respect to the center shaft 44. The belt 43 is held by a groove portion with a V-shape in section formed by the fixed sheave 42a and the movable sheave 42b. The fixed sheave 41a of the primary pulley 41 and the fixed sheave 42a of the secondary pulley 42 are disposed on the opposite sides of the belt 43 in the axial direction.

In addition, a hydraulic servo 45 is disposed on the back surface side of the movable sheave 41b of the primary pulley 41, and a hydraulic servo 46 is disposed on the back surface side of the movable sheave 42b of the secondary pulley 42. A primary pressure is supplied to the hydraulic servo 45 as a working oil pressure from a primary pressure control valve (not illustrated) of the hydraulic control device 12. A secondary pressure is supplied to the hydraulic servo 46 as a working oil pressure from a secondary pressure control valve (not illustrated) of the hydraulic control device 12. The hydraulic servos 45 and 46 are configured to be supplied with the working oil pressures to generate a belt holding force corresponding to load torque, and to generate a holding force for changing or fixing the speed ratio.

An output shaft 47 of the movable sheave 42b of the secondary pulley 42 is connected to the output shaft 60 of the output gear portion 6 via the second clutch C2. That is, the second clutch C2 is provided in the second power transfer path a2. The output gear portion 6 is configured to have the output shaft 60, the input gear 61 which is fixed and coupled to one end side of the output shaft 60, and a counter gear 62 fixed and coupled to the other end side of the output shaft 60. The counter gear 62 is meshed with a driven gear 71 of the counter shaft portion 7.

The counter shaft portion 7 is configured to have a counter shaft 70, the driven gear 71 which is fixed and coupled to the counter shaft 70, and a drive gear 72 fixed and coupled to the counter shaft 70. The drive gear 72 is meshed with a differential ring gear 80 of the differential device 8.

The differential device 8 is configured to transfer rotation of the differential ring gear 80 to the left and right drive shafts 81L and 81R while absorbing a difference in rotation therebetween. The left and right drive shafts 81L and 81R are coupled to left and right wheels (not illustrated), respectively. The differential ring gear 80 is meshed with the drive gear 72, and the driven gear 71 is meshed with the counter gear 62. Thus, the output shaft 60 of the output gear portion 6, the counter shaft 70 of the counter shaft portion 7, and the differential device 8 are drivably coupled to the wheels via the left and right drive shafts 81L and 81R to always operate in conjunction with the wheels. That is, the output shaft 60 is drivably coupled to the wheels.

The mechanical oil pump 18 is coupled to the input shaft 2, and driven by the drive force of the internal combustion engine 16 to be able to generate a source pressure for various hydraulic pressures and supply the source pressure to the hydraulic control device 12. The electric oil pump 19 can be electrically driven, independently of the mechanical oil pump 18, and is controlled by the ECU 11 to generate and supply the modulator pressure $P_{LPM2}$ for generating the engagement pressure PSLG for engagement of at least the meshing clutch. D1 when the internal combustion engine 16 is stopped.

The ECU 11 includes a CPU, a ROM that stores a processing program, a RAM, that temporarily stores data, input and output ports, and a communication port, for example, and outputs various types of signals, such as a control signal for the hydraulic control device 12, from the output port. The vehicle 1 is provided with a shift lever 13 that enables a driver to perform an operation to select a travel range, a shift position detection section (range detection sensor) 14 that detects the shift position of the shift lever 13 as a shift range, and an engine rotational speed detection section (not illustrated) that detects a rotational speed Ne of the crankshaft of the internal combustion engine 16. The shift position detection section 14, the synchronization detection section 15, and the engine rotational speed detection section are connected to the ECU 11 via the input port. That is, the automatic transmission 10 includes the shift position detection section 14 which detects the travel range by detecting the position of the shift lever 13.

Figure 4:
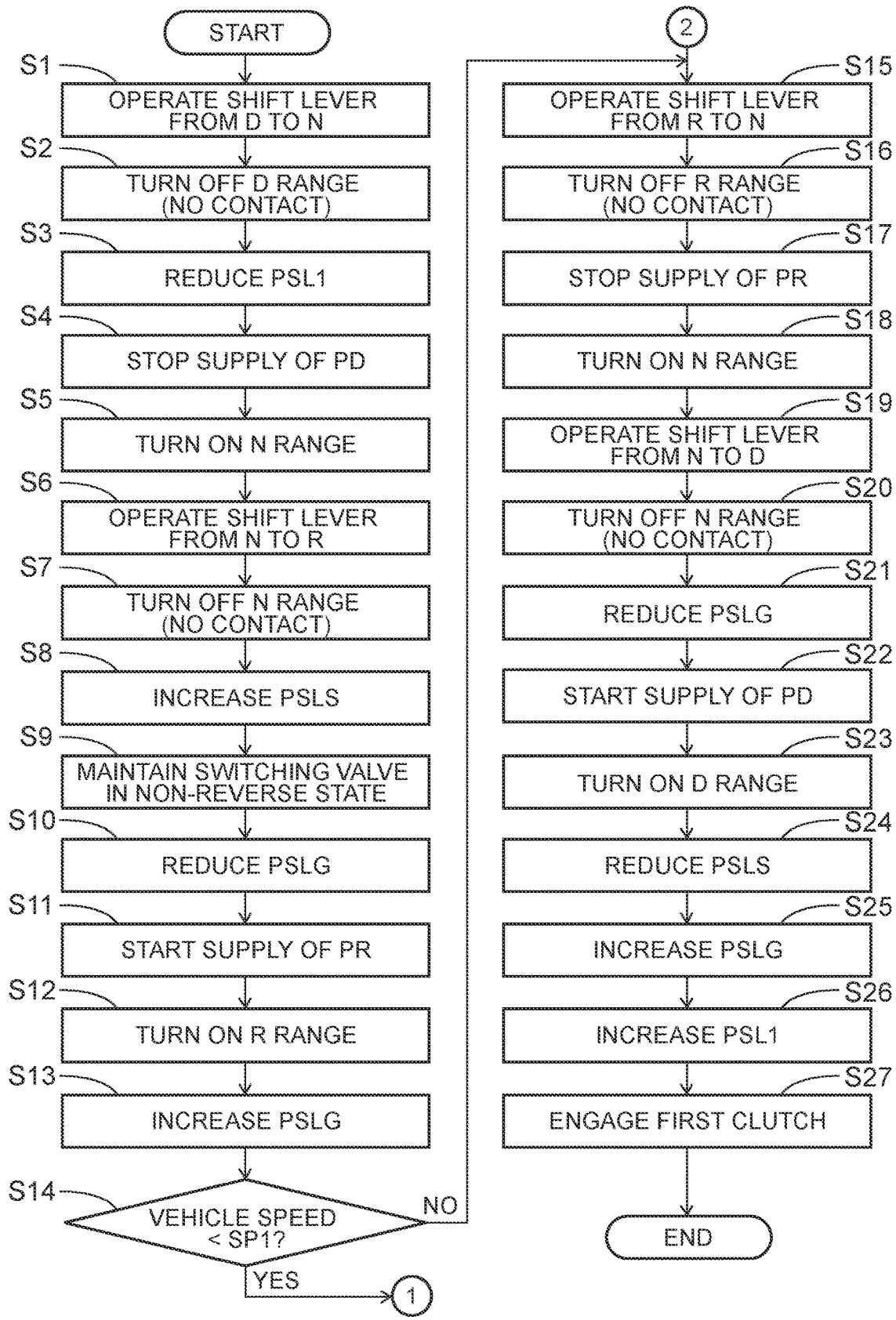
FIG. 4 is a flowchart for a case where reverse prohibition control is executed with the vehicle speed between a first threshold and a second threshold in the hydraulic control device according to the embodiment.
Figure 6A:
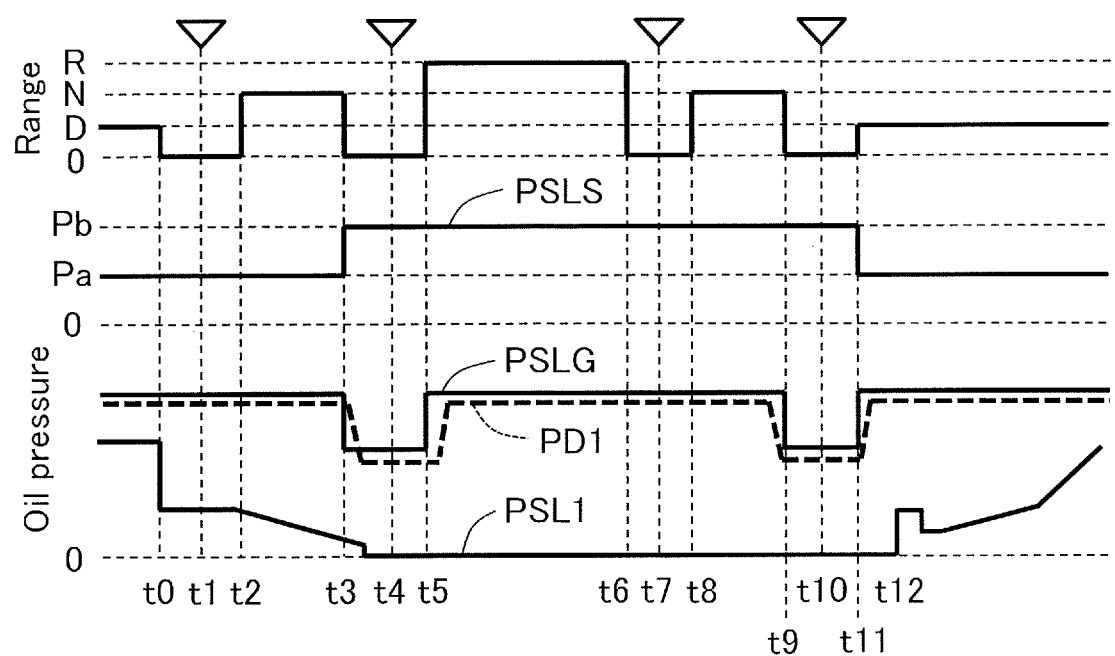
FIG. 6A is a time chart illustrating operation of the hydraulic control device according to the embodiment for a case where the reverse prohibition control is executed with the vehicle speed between the first threshold and the second threshold.

The ECU 11 does not establish a reverse speed as reverse prohibition control in order to protect a power transfer mechanism in the case where the vehicle speed during forward travel is equal to or more than a first threshold SP1 and in the case where the shift lever 13 is switched to the reverse range (steps S12 to S16 in FIG. 4 and t5 to t6 in FIG. 6A). In the present embodiment, the first threshold SP1 is set to 11 km per hour, for example. Therefore, the ECU 11 maintains a switching valve 27 in the non-reverse state by supplying a resisting pressure Pb from a secondary linear solenoid valve SLS to be discussed later while the vehicle speed is equal to or more than the first threshold SP1 and the travel range is switched to at least the reverse range (steps S6 to S9 in FIG. 4 and t3 in FIG. 6A). In the present embodiment, the ECU 11 maintains the switching valve 27 in the non-reverse state by supplying the resisting pressure Pb from the secondary linear solenoid valve SLS when the vehicle speed is equal to or more than the first threshold SP1 and it is not detected that the travel range is the N range (steps S6 to S9 in FIG. 4 and t3 in FIG. 6A). The ECU 11 no longer maintains the switching valve 27 in the non-reverse state by reducing the resisting pressure Pb from the secondary linear solenoid valve SLS when the vehicle speed is equal to or more than the first threshold SP1 and it is detected that the travel range is the forward range with the switching valve 27 maintained in the non-reverse state (steps S23 to S24 in FIG. 4 and t11 in FIG. 6A).

The ECU 11 brings the meshing clutch D1 into the engaged state using the engagement pressure PSLG which is supplied from a linear solenoid valve SLG while the vehicle speed is more than the first threshold SP1 and less than a second threshold SP2 that is larger than the first threshold SP1 and the switching valve 27 is maintained in the non-reverse state with the resisting pressure Pb supplied from the secondary linear solenoid valve SLS (steps S13 to S21 of FIG. 4 and t5 to t9 of FIG. 6A). In the present embodiment, the second threshold SP2 is set to 55 km per hour, for example. The first threshold SP1 being 11 km per hour and the second threshold SP2 being 55 km per hour are merely exemplary, and it is a matter of course that such thresholds have different values.

Figure 7:
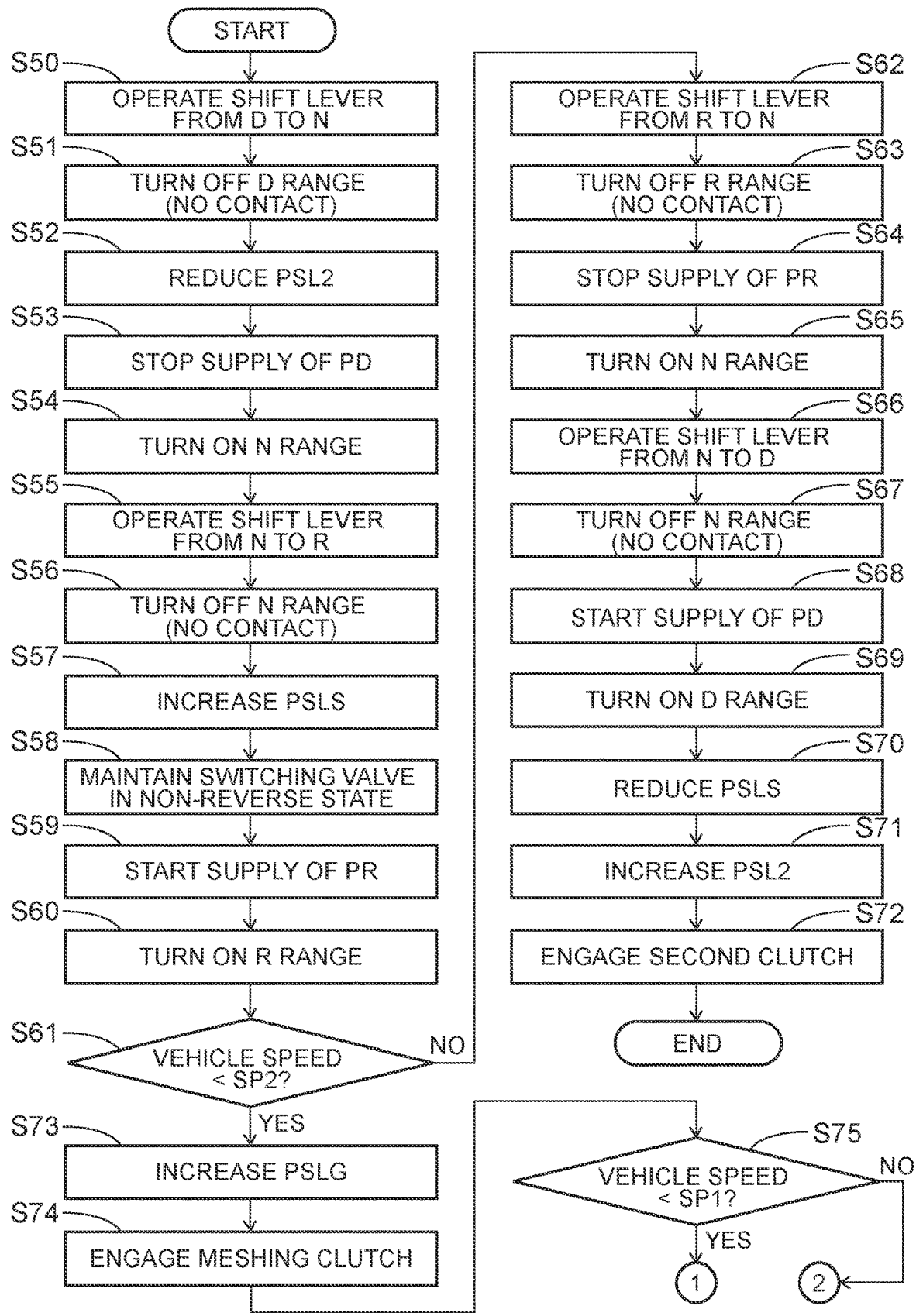
FIG. 7 is a flowchart for a case where the reverse prohibition control is executed with the vehicle speed equal to or more than a second threshold, and for a case where the reverse prohibition control is canceled with the vehicle speed becoming less than the second threshold, in the hydraulic control device according to the embodiment.
Figure 8A:
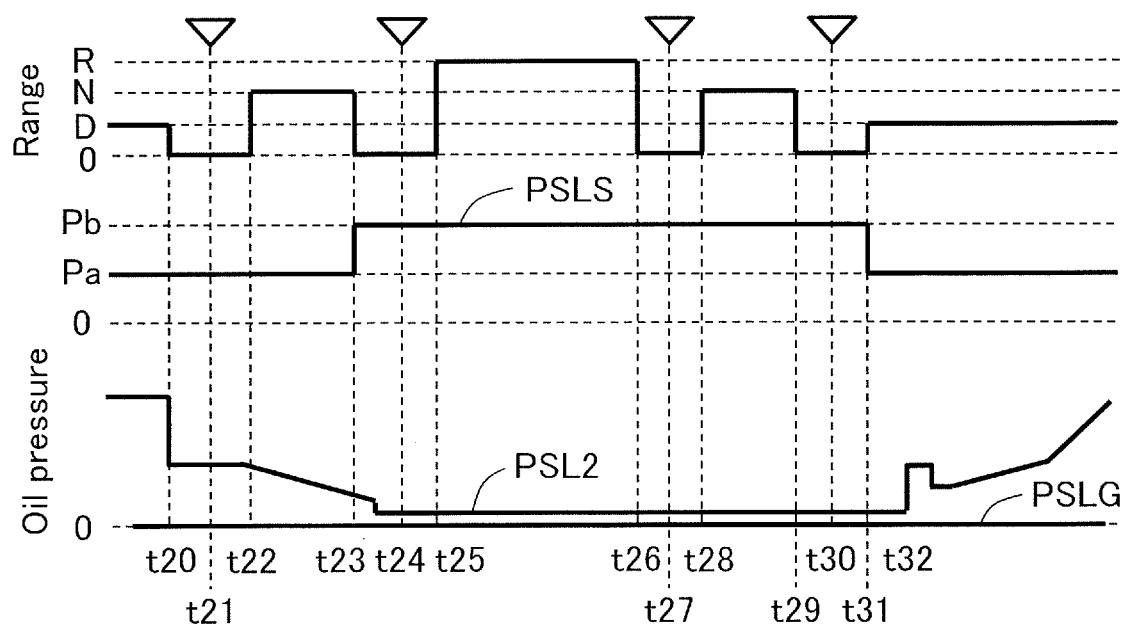
FIG. 8A is a time chart illustrating operation of the hydraulic control device according to the embodiment for a case where the reverse prohibition control is executed with the vehicle speed equal to or more than the second threshold.

The ECU 11 brings the meshing clutch D1 into the disengaged state by reducing the engagement pressure PSLG from the linear solenoid valve SLG while the vehicle speed is equal to or more than the second threshold SP2 and the switching valve 27 is maintained in the non-reverse state by supplying the resisting pressure Pb from the secondary linear solenoid valve SLS (t23 to t31 in FIG. 8A). The ECU 11 brings the meshing clutch D1 into the engaged state using the engagement pressure PSLG which is supplied from the linear solenoid valve SLG, in the case where the vehicle speed is less than the second threshold SP2 when the meshing clutch D1 is brought into the disengaged state by reducing the engagement pressure PSLG from the linear solenoid valve SLG (steps S61 to S74 in FIG. 7 and t40 to t15 in FIG. 8B). In the case where the vehicle speed is less than the first threshold SP1 when the switching valve 27 is maintained in the non-reverse state, the ECU 11 reduces the resisting pressure Pb from the secondary linear solenoid valve SLS, reduces the engagement pressure PSLG from the linear solenoid valve SLG, and engages the brake B1 using the engagement pressure PSLG from the linear solenoid valve SLG after the lapse of a first set time T1 (step S14 in FIG. 4 to step S43 in FIG. 5 and t15 to t18 onward in FIG. 6B). That is, the linear solenoid valve SLG can supply the engagement pressure PSLG for engagement of the meshing clutch D1 or the brake B1.

In the automatic transmission 10 configured as described above, the first clutch C1, the second clutch C2, the meshing clutch D1, and the brake B1 illustrated in the skeleton diagram of FIG. 1 are engaged and disengaged in combinations indicated in the engagement table of FIG. 2 to establish a forward non-continuously-variable mode, a forward continuously-variable mode, and a reverse non-continuously-variable mode. In the reverse non-continuously-variable mode, the automatic transmission 10 transfers rotation by connecting the input shaft 2 and the output shaft 60 to each other through the first power transfer path a1 by bringing the meshing clutch D1 and the brake B1 into the engaged state. In the present embodiment, the forward or reverse non-continuously-variable mode corresponds to a forward first speed or a reverse first speed with which the drive force is rotationally transferred through the first power transfer path a1. However, the present disclosure is not limited thereto, and the forward or reverse non-continuously-variable mode may correspond to multi-step speed change.

Figure 3:
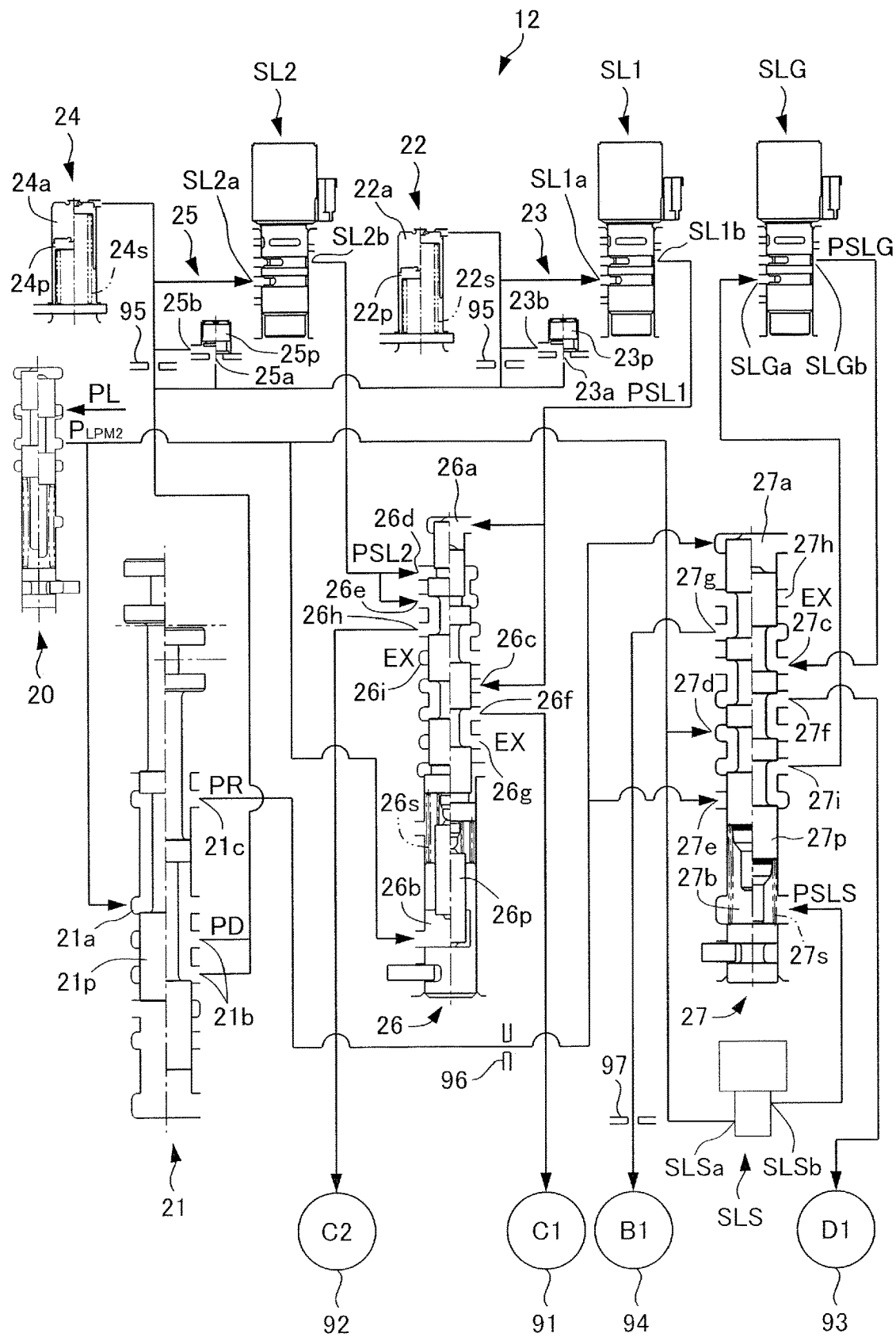
FIG. 3 is a block diagram illustrating a hydraulic control device according to the embodiment.

The hydraulic control device 12 is constituted of a valve body (V/B), for example, and regulates a hydraulic pressure supplied from the mechanical oil pump 18 or the electric oil pump 19 to a line pressure PL and the secondary pressure on the basis of the throttle opening using a primary regulator valve and a secondary regulator valve. As illustrated in FIG. 3, the hydraulic control device 12 includes: a line pressure modulator valve (source pressure generation section/source pressure generator) 20; a manual valve (range pressure supply section/range pressure supplier) 21; a linear solenoid valve SL1; an accumulator 22 and a check valve 23 connected to the linear solenoid valve SL1; a linear solenoid valve SL2; an accumulator 24 and a check valve 25 connected to the linear solenoid valve SL2; a clutch application control valve 26; the switching valve (meshing clutch application control valve) 27; a linear solenoid valve (first solenoid valve) SLG; a primary linear solenoid valve (not illustrated); a secondary linear solenoid valve (second solenoid valve) SLS; and so forth.

The hydraulic control device 12 is connected to: a hydraulic servo 91 that can be actuated by a hydraulic pressure to engage and disengage the first clutch C1; a hydraulic servo 92 that can be actuated by a hydraulic pressure to engage and disengage the second clutch C2; the hydraulic servo 93 which can be actuated by a hydraulic pressure to engage and disengage the meshing clutch D1; and a hydraulic servo 94 that can be actuated by a hydraulic pressure to engage and disengage the brake B1. In addition, the primary linear solenoid valve supplies a primary control pressure to the primary pressure control valve to regulate a primary pressure to be supplied from the primary pressure control valve to the hydraulic servo 45 (see FIG. 1) for the continuously variable speed change mechanism 4. Further, the secondary linear solenoid valve SLS supplies the secondary control pressure PSLS to the secondary pressure control valve to regulate the secondary pressure to be supplied from the secondary pressure control valve to the hydraulic servo 46 (see FIG. 1) for the continuously variable speed change mechanism 4.

Consequently, the hydraulic control device 12 supplies and discharges the engagement pressure in accordance with an instruction from the ECU 11 to control speed change of the continuously variable speed change mechanism 4, engagement and disengagement of the first clutch C1, the second clutch C2, the brake B1, and the meshing clutch D1, and so forth. That is, with the hydraulic control device 12 according to the present embodiment, three linear solenoid valves, namely the linear solenoid valve SL1, the linear solenoid valve SL2, and the linear solenoid valve SLG are utilized to engage and disengage four engagement elements, namely the first clutch C1, the second clutch C2, the brake B1, and the meshing clutch D1.

The line pressure modulator valve 20 regulates the line pressure PL to generate the modulator pressure (source pressure) $P_{LPM2}$, which is a constant pressure that is lower than the line pressure PL.

The manual valve 21 includes: a spool 21p that is mechanically coupled to the shift lever 13 (see FIG. 1) via a link 21L (see FIG. 1) to be moved; an input port 21a to which the modulator pressure $P_{LPM2}$ is input; an output port 21b that outputs the modulator pressure $P_{LPM2}$ as a forward range pressure P1) in the case where the spool 21p is at a D (drive) range position; and an output port 21c that outputs the modulator pressure $P_{LPM2}$ as a reverse range pressure PR in the case where the spool 21p is at an R (reverse) range position. The position of the spool 21p is switched by switching the shift position by operating the shift lever 13. The manual valve 21 supplies the forward range pressure PD in the case where the shift speed is a forward speed, and supplies the reverse range pressure PR in the case where the shift speed is a reverse speed.

The linear solenoid valve SL1 includes an input port SL1a to which the forward range pressure PD is input, and an output port SL1b that communicates with a first working oil chamber 26a and a first input port 26c of the clutch application control valve 26 to be discussed later. The linear solenoid valve SL1 can regulate the input forward range pressure PD, and generates an engagement pressure PSL1 to be supplied to the hydraulic servo 91 to supply the engagement pressure PSL1 from the output port SL1b.

The accumulator 22 includes: a movable member 22p; a spring 22s constituted of a compression coil spring that presses the movable member 22p; and a pressure accumulation oil chamber 22a configured to push in the movable member 22p against the spring 22s to accumulate a pressure. The pressure accumulation oil chamber 22a can accumulate the forward range pressure PD. The accumulator 22 keeps supplying a hydraulic pressure corresponding to the forward range pressure PD to the linear solenoid valve SL1 for a certain time in the case where no forward range pressure PD is provided when the manual valve 21 is switched, so that garage hydraulic pressure control is performed using the linear solenoid valve SL1.

The check valve 23 includes: an input port 23a to which the forward range pressure PD is supplied; an output port 23b that communicates with the pressure accumulation oil chamber 22a of the accumulator 22 and the input port SL1a of the linear solenoid valve SL1; a sealing member 23p that can switchably allow and block communication between the input port 23a and the output port 23b; and a spring (not illustrated). The spring is configured to urge the sealing member 23p so as to block communication between the input port 23a and the output port 23b, and to allow communication from the input port 23a toward the output port 23b at a hydraulic pressure that is lower than the forward range pressure PD. Therefore, when the forward range pressure PD is input to the input port 23a, the sealing member 23p is switched against the spring to allow communication between the input port 23a and the output port 23b so that a hydraulic pressure can flow in only one direction from the input port 23a to the output port 23b.

An orifice 95 is disposed in an oil passage that allows communication between an oil passage that allows communication between the output port 21b of the manual valve 21 and the input port 23a of the check valve 23 and an oil passage that allows communication between the output port 23b of the check valve 23 and the input port SL1a of the linear solenoid valve SL1. Consequently, it is possible to extend the time over which the accumulator 22 can supply a hydraulic pressure corresponding to the forward range pressure PD to the linear solenoid valve SL1 with no forward range pressure PD provided compared to a case where the orifice 95 is not provided.

The linear solenoid valve SL2 includes: an input port SL2a to which the forward range pressure PD is input; and an output port SL2b that communicates with a second input port 26d and a third input port 26e of the clutch application control valve 26. The linear solenoid valve SL2 can regulate the input forward range pressure PD, and generates an engagement pressure PSL2 to be supplied to the hydraulic servo 92 to supply the engagement pressure PSL2 from the output port SL2b. The accumulator 24, the check valve 25, and the orifice 95 are connected to the linear solenoid valve SL2. Such components are similar in configuration to the accumulator 22, the check valve 23, and the orifice 95 which are connected to the linear solenoid valve SL1 discussed above, and thus will not be described in detail.

The clutch application control valve 26 includes: a spool 26p that can be switched between a position (normal state) (hereinafter referred to as a "left-half position") indicated in the left half in the drawing and a position (tie-up prevention state) (hereinafter referred to as a "right-half position") indicated in the right half in the drawing; and a spring 26s constituted of a compression coil spring that urges the spool 26p toward the left-half position. The clutch application control valve 26 includes: the first working oil chamber 26a to which the engagement pressure PSL1 is input in the direction in which the spool 26p is pressed toward the right-half position; and a second working oil chamber 26b to which the modulator pressure $P_{LPM2}$ is input in the direction in which the spool 26p is pressed toward the left-half position. The clutch application control valve 26 also includes: the first input port 26c to which the engagement pressure PSL1 is input; and the second input port 26d and the third input port 26e to which the engagement pressure PSL2 is input. The clutch application control valve 26 further includes: a first output port 26f that communicates with the hydraulic servo 91; a drain port 26g; a second output port 26h that communicates with the hydraulic servo 92; and a drain port 26i.

The pressure receiving area of the spool 26p is set to be the same for the first working oil chamber 26a and the second working oil chamber 26b. For the second input port 26d, meanwhile, the pressure receiving area of the spool 26p is set to be different between both sides in the axial direction of the spool 26p such that the pressure receiving area for pressing the spool 26p toward the right-half position is larger. Further, the urging force of the spring 26s is set to be smaller than the pressing force for pressing the spool 26p toward the right-half position due to the difference in pressure receiving area of the spool 26p When the engagement pressure PSL2 is supplied to the second input port 26d. Consequently, in the case where the linear solenoid valves SL1 and SL2 are actuated concurrently so that the engagement pressures PSL1 and PSL2 are output concurrently, the engagement pressure PSL1 and the modulator pressure $P_{LPM2}$ cancel out each other on both end surfaces of the spool 26p, and the pressing force for pressing the spool 26p toward the right-half position due to the difference in pressure receiving area of the spool 26p when the engagement pressure PSL2 is supplied to the second input port 26d overcomes the spring 26s so that the spool 26p is switched to the right-half position.

The clutch application control valve 26 is configured such that communication between the first input port 26e and the first output port 26f is allowed and communication between the third input port 26e and the second output port 26h is allowed when the spool 26p is in the normal state at the left-half position. Meanwhile, the clutch application control valve 26 is configured such that communication between the first input port 26c and the first output port 26f is blocked, communication between the first output port 26f and the drain port 26g is allowed, communication between the third input port. 26e and the second output port. 26h is blocked, and communication between the second output port 26h and the drain port 26i is allowed when the spool 26p is in the tie-up prevention state at the right-half position.

Thus, in the case where the linear solenoid valve SL1 is actuated and the linear solenoid valve SL2 is not actuated, the engagement pressure PSL1 is supplied to the hydraulic servo 91 with the clutch application control valve 26 kept in the normal state. In the case where the linear solenoid valve SL2 is actuated and the linear solenoid valve SL1 is not actuated, meanwhile, the engagement pressure PSL2 is supplied to the hydraulic servo 92 with the clutch application control valve 26 kept in the normal state. In the case where both the linear solenoid valves SL1 and SL2 are actuated, further, the clutch application control valve 26 is switched to the tie-up prevention state, and a hydraulic pressure is drained from both the hydraulic servos 91 and 92. However, the present disclosure is not limited thereto, and a hydraulic pressure may be drained from one of the hydraulic servos 91 and 92, and the other may be engaged. Consequently, it is possible to prevent the hydraulic servo 91 and the hydraulic servo 92 from being supplied with an engagement pressure concurrently, and thus to prevent occurrence of tie-up due to concurrent engagement of the first clutch C1 and the second clutch C2.

The linear solenoid valve SLG includes: an input port SLGa that communicates with a third output port 27i of the switching valve 27; and an output port SLGb that communicates with the first input port 27c of the switching valve 27. The linear solenoid valve SLG can regulate the modulator pressure $P_{LPM2}$ or the reverse range pressure PR which has been input, and generates the engagement pressure PSLG to be supplied to either of the hydraulic servos 93 and 94 to supply the engagement pressure PSLG from the output port SLGb.

The secondary linear solenoid valve SLS includes: an input port SLSa to which the modulator pressure $P_{LPM2}$ is input; and an output port SLSb that communicates with a second working oil chamber 27b of the switching valve 27. The secondary linear solenoid valve SLS can regulate the input modulator pressure $P_{LPM2}$, and generates the secondary control pressure PSLS to supply the secondary control pressure PSLS from the output port SLSb to the switching valve 27 as the resisting pressure Pb. That is, the secondary linear solenoid valve SLS can supply the secondary control pressure PSLS which maintains the switching valve 27 in the non-reverse state to be discussed later against the reverse range pressure PR. The output port SLSb communicates with the secondary pressure control valve (not illustrated).

The switching valve 27 includes: a spool 27p that can be switched between a position (non-reverse state) indicated in the left half in the drawing and a position (reverse state) indicated in the right half in the drawing; and a spring 27s constituted of a compression coil spring that urges the spool 27p toward the left-half position. Here, in the present embodiment, in the non-reverse state, the engagement pressure PSLG which is supplied from the linear solenoid valve SLG is supplied to the meshing clutch D1, and a hydraulic pressure in the brake B1 is drained. In the reverse state, meanwhile, the engagement pressure PSLG which is supplied from the linear solenoid valve SLG is supplied to the brake B1, and the modulator pressure $P_{LPM2}$ is supplied to the meshing clutch D1.

The switching valve 27 includes: a first working oil chamber 27a to which the reverse range pressure PR is input in the direction in which the spool 27p is pressed toward the right-half position; and the second working oil chamber 27b to which the secondary control pressure PSLS is input in the direction in which the spool 27p is pressed toward the left-half position. The switching valve 27 also includes: the first input port 27c to which the engagement pressure PSLG is input; a second input port 27d to which the modulator pressure $P_{LPM2}$ is input; and a third input port 27e to which the reverse range pressure PR is input. The switching valve 27 further includes: a first output port 27f that communicates with the hydraulic servo 93; a second output port 27g that communicates with the hydraulic servo 94; a drain port 27h; and the third output port 27i which communicates with the input port SLGa of the linear solenoid valve SLG.

An orifice 96 is disposed in an oil passage that allows communication between the first working oil chamber 27a and the third input port 27e and the output port 21c of the manual valve 21. Consequently, it is possible to lower the speed at which the switching valve 27 is switched from the non-reverse state to the reverse state when the travel range is switched from a range other than the reverse range to the reverse range. In particular, it is possible to maintain the spool 27p in the non-reverse state by supplying the secondary control pressure PSLS from the secondary linear solenoid valve SLS to the switching valve 27 before the reverse range pressure PR moves the spool 27p of the switching valve 27 in the case where the travel range is switched to the reverse range before the meshing clutch. D1 is engaged. In addition, it is possible to lower the speed at which the switching valve 27 is switched from the reverse state to the non-reverse state, and hence to lower the draining speed of the hydraulic servo 93 and the hydraulic servo 94, when the travel range is switched from the reverse range to another range.

An orifice 97 is disposed in an oil passage that allows communication between the second output port 27g and the hydraulic servo 94. Consequently, it is possible to reduce the draining speed of the hydraulic servo 94 after the switching valve 27 is switched from the reverse state to the non-reverse state.

The pressure receiving area of the spool. 27p is set to be the same for the first working oil chamber 27a and the second working oil chamber 27b. In addition, the urging force of the spring 27s is set to be smaller than the pressing force for pressing the spool 27p toward the right-half position when the reverse range pressure PR is supplied to the first working oil chamber 27a. Consequently, the spool 27p is switched to the right-half position in the case where the reverse range pressure PR is supplied and the secondary contrary pressure PSLS is not supplied, and the spool 27p is positioned at the left-half position by the urging force of the spring 27s with the reverse range pressure PR and the secondary control pressure PSLS canceling out each other on both end surfaces of the spool 27p in the case Where the reverse range pressure PR is supplied and the secondary control pressure PSLS is supplied.

The switching valve 27 is configured such that the first input port 27c is communicated with the first output port 27f but not communicated with the second output port 27g, the second input port 27d is communicated with the third output port 27i but not communicated with the first output port 27f, communication between the second output port 27g and the drain port 27h is allowed, and the third input port 27e is blocked when the spool 27p is in the non-reverse state at the left-half position. Meanwhile, the switching valve 27 is configured such that the first input port 27c is communicated with the second output port 27g but not communicated with the first output port 27f, the second input port 27d is communicated with the first output port 27f but not communicated with the third output port 27i, communication between the third input port 27e and the third output port 27i is allowed, and the drain port 27h is blocked when the spool 27p is in the reverse state at the right-half position.

Thus, in the case where the shift position of the manual valve 21 is a range other than the reverse range and the reverse range pressure PR is not generated, or in the case where the secondary control pressure PSLS is supplied even if the shift position is the reverse range and the reverse range pressure PR is generated, the switching valve 27 is kept in the non-reverse state, and the modulator pressure $P_{LPM2}$ passes through the switching valve 27 to be supplied to the linear solenoid valve SLG, the engagement pressure PSLG passes through the switching valve 27 to be supplied to the hydraulic servo 93, and a hydraulic pressure is drained from the hydraulic servo 94 via the switching valve 27. Meanwhile, in the case where the shift position is the reverse range and the reverse range pressure PR is generated and the secondary control pressure PSLS is not supplied, the switching valve 27 is switched to the reverse state, and the modulator pressure $P_{LPM2}$ passes through the switching valve 27 to be supplied to the hydraulic servo 93, the reverse range pressure PR passes through the switching valve 27 to be supplied to the linear solenoid valve SLG; and the engagement pressure PSLG passes through the switching valve 27 to be supplied to the hydraulic servo 94.

Next, operation for a case where the reverse prohibition control is executed with the shift lever 13 switched from the D position to the R position via the N position during forward travel in the vehicle 1 on which the hydraulic control device 12 for the automatic transmission 10 is mounted will be described with reference to FIGS. 4 to 8B.

Figure 5:
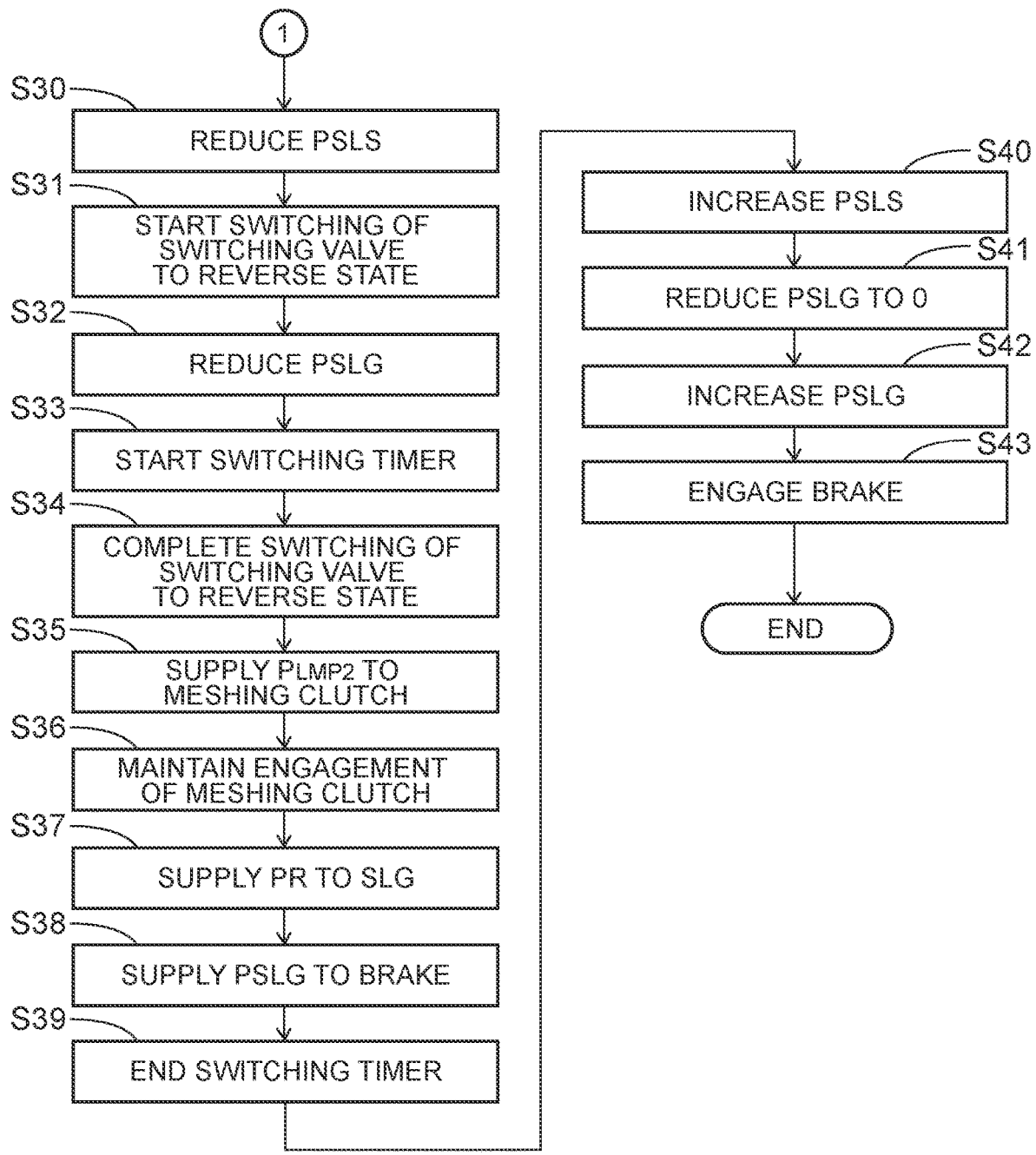
FIG. 5 is a flowchart for a case where the reverse prohibition control is canceled with the vehicle speed becoming less than the first threshold in the hydraulic control device according to the embodiment.

First, travel at a speed ratio corresponding to the forward first speed utilizing the first power transfer path a1 in the forward non-continuously-variable mode with the vehicle speed equal to or more than the first threshold SP1 will be described with reference to the flowcharts illustrated in FIGS. 4 and 5 and the time charts illustrated in FIGS. 6A and 6B. At this time, the shift lever 13 is in the D position, the forward range pressure PD is output from the manual valve 21, and the switching valve 27 is in the non-reverse state. Therefore, the meshing clutch D1 is engaged by the engagement pressure PSLG using the modulator pressure $P_{LPM2}$ as the source pressure, and the brake B1 is in the drained state. In addition, the secondary control pressure PSLS is at a stand-by pressure Pa at which the belt 43 (see FIG. 1) does not slip. The engagement pressure PSL1 is supplied from the linear solenoid valve SL1 to the hydraulic servo 91 (see FIG. 1) for the first clutch C1.

First, as illustrated in FIG. 4, the driver starts an operation to switch the shift lever 13 from the D position to the N position (step S1; t0 in FIG. 6A). When the operation to switch the Shift lever 13 is started, the ECU 11 detects that a no-contact state in which no range is detected has been established with a D-range output from the shift position detection section 14, which has been detected so far, turned off (step S2; t0 in FIG. 6A). The ECU 11 instructs the linear solenoid valve SL1 to reduce the engagement pressure PSL1 (step S3; t0 in FIG. 6A). Consequently, the engagement pressure PSL1 is reduced, and the first clutch. C1 is disengaged (t0 in FIG. 6A onward). When the operation to switch the shift lever 13 progresses, the spool 21p of the manual valve 21 is moved to the N range position (t1 in FIG. 6A), and supply of the forward range pressure PD from the output port 21b of the manual valve 21 is stopped (step S4).

When the shift lever 13 is switched to the N position, the ECU 11 detects that an N-range output from the shift position detection section 14 has been turned on (step S5; t2 in FIG. 6A). Further, when the driver performs an operation to switch the shift lever 13 from the N position to the R position (step S6; t3 in FIG. 6A), the ECU 11 detects that a no-contact state in which no range is detected has been established with the N-range output from the shift position detection section 14 turned off (step S7; t3 in FIG. 6A).

The ECU 11 instructs the secondary linear solenoid valve SLS to increase the secondary control pressure PSLS from the stand-by pressure Pa to the resisting pressure Pb (step S8; t3 in FIG. 6A). Consequently, the secondary control pressure PSLS is increased from the stand-by pressure Pa to the resisting pressure Pb, and supplied to the second working oil chamber 27b of the switching valve 27 to maintain the switching valve 27 in the non-reverse state (step S9). That is, the hydraulic control device 12 maintains the switching valve 27 in the non-reverse state by supplying the resisting pressure Pb from the secondary linear solenoid valve SLS when the vehicle speed is equal to or more than the first threshold SP1 and it is no longer detected that the travel range is a non-travel range.

In addition, the ECU 11 issues an instruction to reduce the engagement pressure PSLG by controlling the linear solenoid valve SLG (step S10; t3 in FIG. 6A). Here, the engagement pressure PSLG is reduced in the range of down to a minimum holding pressure, which is the lowest possible pressure that is larger than the urging force of the urging spring 59 and at which the meshing clutch D1 is kept in the engaged state, and the meshing clutch D1 is kept in the engaged state. In the present embodiment, the ECU 11 sequentially increases the secondary control pressure PSLS (step S8) and reduces the engagement pressure PSLG (step S10) after the N-range output from the shift position detection section 14 is turned off (step S7). However, the present disclosure is not limited thereto, and such steps may be executed in the opposite order, or may be executed concurrently.

When the operation to switch the shift lever 13 progresses, the spool 21p of the manual valve 21 is moved to the R range position (t4 in FIG. 6A), and supply of the reverse range pressure PR as the modulator pressure $P_{LPM2}$ from the output port 21c of the manual valve 21 is started (step S11). At this time, the secondary control pressure PSLS is supplied to the second working oil chamber 27b of the switching valve 27. Thus, the spool 27p is maintained in the non-reverse state by the secondary control pressure PSLS and the urging force of the spring 27s even if the reverse range pressure PR is supplied to the first working oil chamber 27a.

When the shift lever 13 is switched to the R position, the ECU 11 detects that an R-range output from the shift position detection section 14 has been turned on (step S12; t5 in FIG. 6A). The ECU 11 instructs the linear solenoid valve SLG to increase the engagement pressure PSLG (step S13; 15 in FIG. 6A).

The ECU 11 determines whether or not the vehicle speed is less than the first threshold SP1 in the case where the travel range is the reverse range (step S14). In the case where it is determined that the vehicle speed is not less than the first threshold SP1, the ECU 11 executes reverse prohibition control. The determination as to whether or not the vehicle speed is less than the first threshold SP1 is made continuously while the travel range is the reverse range.

During the reverse prohibition control, when the driver performs an operation to switch the shift lever 13 from the R position to the N position (step S15; t6 in FIG. 6A), the ECU 11 detects that a no-contact state in which no range is detected has been established with the R-range output from the shift position detection section 14 turned off (step S16; t6 in FIG. 6A). When the operation to switch the shift lever 13 progresses, the spool 21p of the manual valve 21 is moved to the N range position (t7 in FIG. 6A), and supply of the reverse range pressure PR from the output port 21c of the manual valve 21 is stopped (step S17).

When the shift lever 13 is switched to the N position, the ECU 11 detects that an N-range output from the shift position detection section 14 has been turned on (step S18;

t8 in FIG. 6A). Further, when the driver performs an operation to switch the shift lever 13 from the N position to the D position (step S19; t9 in FIG. 6A), the ECU 11 detects that a no-contact state in which no range is detected has been established with the N-range output from the shift position detection section 14 turned off (step S20; t9 in FIG. 6A). Here, as discusses above, the ECU 11 performs control so as to increase the secondary control pressure PSLS to the resisting pressure Pb when the N-range output from the shift position detection section 14 is turned off (step S7; t3 in FIG. 6A). Therefore, although the ECU 11 performs control so as to increase the secondary control pressure PSLS to the resisting pressure Pb also at t9 in FIG. 6A, the secondary control pressure PSLS is already at the resisting pressure Pb at this time, and thus the secondary control pressure PSLS is maintained, rather than being increased.

The ECU 11 issues an instruction to reduce the engagement pressure PSLG by controlling the linear solenoid valve SLG (step S21; t9 in FIG. 6A). Here, the engagement pressure PSLG is reduced in the range of down to the minimum holding pressure, and the meshing clutch D1 is kept in the engaged state. When the operation to switch the shift lever 13 progresses, the spool 21p of the manual valve 21 is moved to the D range position (t10 in FIG. 6A), and supply of the forward range pressure PD as the modulator pressure $P_{LPM2}$ from the output port 21b of the manual valve 21 is started (step S22). When the shift lever 13 is switched to the D position, the ECU 11 detects that a D-range output from the shift position detection section 14 has been turned on (step S23; t11 in FIG. 6A).

The ECU 11 issues an instruction to reduce the secondary control pressure PSLS from the resisting pressure Pb to the stand-by pressure Pa by controlling the secondary linear solenoid valve SLS (step S24; t11 in FIG. 6A). Consequently, the secondary control pressure PSLS is reduced from the resisting pressure Pb to the stand-by pressure Pa, and the resisting pressure Pb is no longer supplied to the second working oil chamber 27b of the switching valve 27. However, the reverse range pressure PR is not supplied, and thus the switching valve 27 remains in the non-reverse state. That is, the hydraulic control device 12 no longer maintains the switching valve 27 in the non-reverse state by reducing the resisting pressure Pb from the secondary linear solenoid valve SLS when the vehicle speed is equal to or more than the first threshold SP1 and it is detected that the travel range is the forward range with the switching valve 27 maintained in the non-reverse state.

In addition, the ECU 11 instructs the linear solenoid valve SLG to increase the engagement pressure PSLG (step S25; t11 in FIG. 6A). In the present embodiment, the ECU 11 sequentially reduces the secondary control pressure PSLS (step S24) and increases the engagement pressure PSLG (step S25) after the D-range output is turned on (step S23). However, the present disclosure is not limited thereto, and such steps may be executed in the opposite order, or may be executed concurrently.

The ECU 11 increases the engagement pressure PSL1 by controlling the linear solenoid valve SEA (step S26; t12 in FIG. 6A onward), and engages the first clutch C1 (step S27; t12 in FIG. 6A onward). Consequently, forward travel utilizing the first power transfer path a1 in the forward non-continuously-variable mode can be restored as in step S1 and earlier.

A process for a case where the ECU 11 determines in step S14 that the vehicle speed is less than the first threshold SP1 will be described with reference to FIG. 5. In this case, the reverse prohibition control is stopped, the meshing clutch D1 and the brake B1 are engaged in the reverse range, and the vehicle travels in reverse in the reverse non-continuously-variable mode. The procedures for such a process will be described below.

Figure 6B:
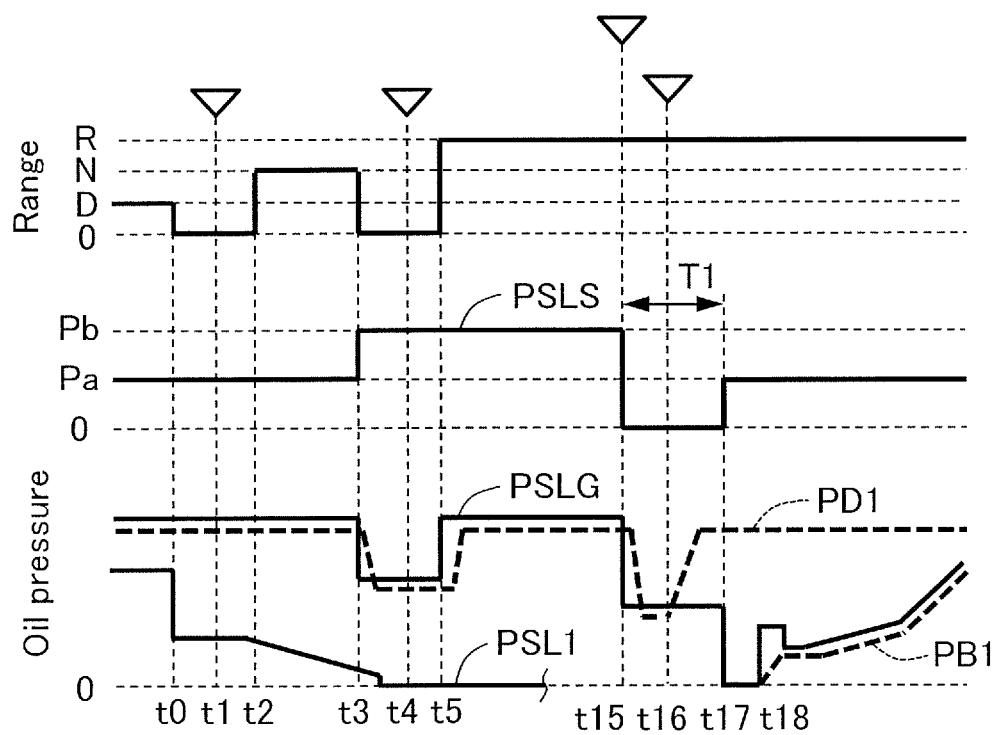
FIG. 6B is a time chart illustrating operation of the hydraulic control device according to the embodiment for a case where the reverse prohibition control is canceled with the vehicle speed becoming less than the first threshold.

First, after it is determined that the vehicle speed is less than the first threshold SP1, the ECU 11 issues an instruction to reduce the secondary control pressure PSLS from the resisting pressure Pb to substantially zero by draining a hydraulic pressure from the secondary linear solenoid valve SLS (step S30; t15 in FIG. 6B). Consequently, the secondary control pressure PSLS is reduced from the resisting pressure Pb to substantially zero, and the resisting pressure Pb is no longer supplied to the second working oil chamber 27b of the switching valve 27, which starts switching of the switching valve 27 to the reverse state using the reverse range pressure PR (step S31). In addition, after it is determined that the vehicle speed is less than the first threshold SP1, the ECU 11 issues an instruction to reduce the engagement pressure PSLG from the maximum pressure to the minimum holding pressure for the meshing clutch D1 by controlling the linear solenoid valve SLG (step S32; t15 in FIG. 6B). The minimum holding pressure here is a hydraulic pressure that is the lowest possible pressure that is larger than the urging force of the urging spring 59 and at which the meshing clutch D1 is kept in the engaged state. Here, the ECU 11 issues an instruction to reduce the engagement pressure PSLG from the maximum pressure to the minimum holding pressure for the meshing clutch D1. However, the present disclosure is not limited thereto, and the ECU 11 may issue an instruction to reduce the engagement pressure PSLG to a hydraulic pressure that is higher than the minimum holding pressure.

After it is determined that the vehicle speed is less than the first threshold SP1, the ECU 11 starts a switching timer (step S33; t15 in FIG. 6B). The switching timer is configured to switch the switching valve 27 before a first set time T1 elapses since the start. In the present embodiment, the ECU 11 sequentially reduces the secondary control pressure PSLS (step S30), reduces the engagement pressure PSLG (step S32), and starts the switching timer (step S33) after it is determined that the vehicle speed is less than the first threshold SP1. However, the present disclosure is not limited thereto, and such steps may be executed in a different order, or may be executed concurrently.

Switching of the switching valve 27 to the reverse state by the reverse range pressure PR is completed before the first set time T1 elapses since the switching timer is started (step S34; t16 in FIG. 6B). Consequently, the modulator pressure $P_{LPM2}$ is supplied to the hydraulic servo 93 for the meshing clutch D1 (step S35; 116 in FIG. 6B onward), and the meshing clutch D1 is maintained in the engaged state (step S36; t16 in FIG. 6B onward). In addition, when the switching valve 27 is switched to the reverse state, the reverse range pressure PR is supplied to the linear solenoid valve SLG (step S37; t16 in FIG. 6B onward), and the engagement pressure PSLG is supplied to the hydraulic servo 94 for the brake B1 from which a hydraulic pressure has been drained (step S38; t16 in FIG. 6B onward). Here, during operation of the switching timer, the engagement pressure PSLG at the minimum holding pressure is output from the linear solenoid valve SLG. Therefore, the minimum holding pressure is supplied to the hydraulic servo 94 for the brake B1 when the switching valve 27 is switched to the reverse state. Since the minimum holding pressure is much lower than the engagement pressure for the brake B1, however, the brake B1 is not abruptly engaged.

After that, the ECU 11 ends the switching timer when the first set time T1 elapses since the switching timer is started (step S39; t17 in FIG. 6B). After the switching timer is ended, the ECU 11 instructs the secondary linear solenoid valve SLS to increase the secondary control pressure PSLS to the stand-by pressure Pa (step S40; t17 in FIG. 6B). Consequently, the secondary control pressure PSLS is increased to the stand-by pressure Pa, which prevents the belt 43 (see FIG. 1) from slipping. After the switching timer is ended, the ECU 11 issues an instruction to reduce the engagement pressure PSLG from the minimum holding pressure to substantially zero by draining a hydraulic pressure from the linear solenoid valve SLG (step S41; t17 in FIG. 6B). The ECU 11 is not limited to draining a hydraulic pressure from the linear solenoid valve SLG after the switching timer is ended, and may execute fast fill by increasing the engagement pressure PSLG from the minimum holding pressure without draining a hydraulic pressure, for example. Further, the ECU 11 increases the engagement pressure PSLG by controlling the linear solenoid valve SLG (step S42; t18 in FIG. 6B onward), and engages the brake B1 (step S43; t18 in FIG. 6B onward).

The period for which the ECU 11 maintains the secondary control pressure PSLS being increased to the resisting pressure Pb may be at least a period for which the reverse range pressure PR is supplied from the manual valve 21.

Therefore, the timing when the ECU 11 increases the secondary control pressure PSLS from the stand-by pressure Pa to the resisting pressure Pb is not limited to the timing when the N-range output from the shift position detection section 14 is turned off (t3 in FIG. 6A) as in the embodiment discussed above, and may be a timing before supply of the reverse range pressure PR from the output port 21c of the manual valve 21 is started (t4 in FIG. 6A). That is, the timing may be when the D-range output from the shift position detection section 14 is turned off (t0 in FIG. 6A), or when the N-range output from the shift position detection section 14 is turned on (t2 in FIG. 6A), for example. It should be noted, however, that it is not clear, at the time when the N-range output from the shift position detection section 14 is turned off whether the travel range is changed to the R range or the D range thereafter. Thus, the secondary control pressure PSLS is preferably increased to the resisting pressure Pb at such a time. In addition, in the case Where the secondary control pressure PSLS is increased to the resisting pressure Pb when the N-range output from the shift position detection section 14 is turned off, the time during which the secondary control pressure PSLS increased to the resisting pressure Pb is maintained can be shortened compared to a case where the secondary control pressure PSLS is increased at an earlier timing. Thus, the secondary control pressure PSLS is preferably increased at such a timing also from the viewpoint of improving the fuel efficiency.

In addition, the timing when the ECU 11 reduces the secondary control pressure PSLS from the resisting pressure Pb to the stand-by pressure Pa is not limited to the timing when the D-range output from the shift position detection section 14 is turned on (t11 in FIG. 6A) as in the embodiment discussed above, and may be a timing after supply of the reverse range pressure PR from the output port 21c of the manual valve 21 is stopped (t7 in FIG. 6A). That is, the timing may be when the N-range output from the shift position detection section 14 is turned on (t8 in FIG. 6A), or when the N-range output from the shift position detection section 14 is turned off (t9 in FIG. 6A), for example. For example, the secondary control pressure PSLS may be reduced to the stand-by pressure Pa when the N-range output from the shift position detection section 14 is turned on (t8 in FIG. 6A), for example. In this case, the secondary control pressure PSLS is increased to the resisting pressure Pb again when the N-range output is turned off thereafter (t9 in FIG. 6A), and the secondary control pressure PSLS is reduced to the stand-by pressure Pa when the D-range output is turned on (t11 in FIG. 6A).

In the example illustrated in FIGS. 4 to 6B discussed above, travel at a speed ratio corresponding to the forward first speed utilizing the first power transfer path a1 in the forward non-continuously-variable mode with the vehicle speed equal to or more than the first threshold SP1 is described. A similar process, except that the second clutch C2 rather than the first clutch C1 is to be engaged, can also be applied to travel at a speed ratio corresponding to the second forward speed or higher utilizing the second power transfer path a2 in the forward continuously-variable mode with the vehicle speed equal to or more than the first threshold SP1 and less than the second threshold SP2.

In the case where the vehicle speed is equal to or more than the first threshold SP1 and the travel range is the reverse range, unlike the hydraulic control device 12 for the automatic transmission 10 according to the present embodiment, the reverse prohibition control is executed without supplying the secondary control pressure PSLS to the switching valve 27 as follows. In this case, the ECU 11 executes control so as to disengage the brake B1 without supplying the engagement pressure PSLG by draining a hydraulic pressure from the linear solenoid valve SLG, for example, when travel range is switched from the N range to the reverse range. Here, with the manual valve 21, there may occur variations in the time lag between the timings of mechanical switching of the spool 21p of the manual valve 21 and electrical switching of the shift position detection section 14 when the shift lever 13 is switched.

Therefore, if a hydraulic pressure is drained from the linear solenoid valve SLG when the ECU 11 detects that the N-range output is turned off because of switching of the shift lever 13, the meshing clutch D1 may be disengaged before the switching valve 27 is actually switched to the reverse state, which may require a long time for re-engagement. If an output of the engagement pressure PSLG for the meshing clutch D1 from the linear solenoid valve SLG is maintained, even if the ECU 11 detects that the N-range output is turned off because of switching of the shift lever 13, meanwhile, the engagement pressure PSLG may be supplied to the hydraulic servo 94 for the brake B1 after the switching valve 27 is actually switched to the reverse state, which may abruptly engage the brake B1.

In contrast, the hydraulic control device 12 for the automatic transmission 10 according to the present embodiment can maintain the switching valve 27 in the non-reverse state by supplying the resisting pressure Pb from the secondary linear solenoid valve SLS while the vehicle speed is equal to or more than the first threshold SP1 and the travel range is switched to at least the reverse range. Therefore, the engagement pressure PSLG which is supplied from the linear solenoid valve SLG is supplied to the meshing clutch D1, and a hydraulic pressure in the brake B1 is drained. Thus, disengagement of the meshing clutch D1 and abrupt engagement of the brake B1 can be suppressed in the case where the shift lever 13 is switched to the reverse range during forward travel.

Next, travel at a speed ratio corresponding to the forward second speed or higher utilizing the second power transfer path a2 in the forward continuously-variable mode with the vehicle speed equal to or more than the first threshold SP1 and the second threshold SP2 will be described with reference to the flowchart illustrated in FIG. 7 and the time charts illustrated in FIGS. 8A and 8B. At this time, the shift lever 13 is in the D position, the forward range pressure PD is output from the manual valve 21, and the switching valve 27 is in the non-reverse state. In addition, in order to avoid a difference in rotation in the first clutch C1 since the vehicle is traveling at a high speed, the ECU 11 disengages the meshing clutch D1 by controlling the linear solenoid valve SLG so as not to supply the engagement pressure PSLG. The secondary control pressure PSLS is the stand-by pressure Pa at which the belt 43 (see FIG. 1) does not slip. The engagement pressure is supplied from the linear solenoid valve SL2 to the hydraulic servo 92 (see FIG. 1) for the second clutch C2.

First, as illustrated in FIG. 7, the driver starts an operation to switch the shift lever 13 from the D position to the N position (step S50; t20 in FIG. 8A). When the operation to switch the shift lever 13 is started, the ECU 11 detects that a no-contact state in which no range is detected has been established with the D-range output from the shift position detection section 14, which has been detected so far, turned off (step S51; t20 in FIG. 8A). The ECU 11 instructs the linear solenoid valve SL2 to reduce the engagement pressure PSL2 (step S52; t20 in FIG. 8A). Consequently, the engagement pressure PSL2 is reduced, and the second clutch C2 is disengaged (t20 in FIG. 8A onward). When the operation to switch the shift lever 13 progresses, the spool 21p of the manual valve 21 is moved to the N range position (t21 in FIG. 8A), and supply of the forward range pressure PD from the output port 21b of the manual valve 21 is stopped (step S53).

When the shift lever 13 is switched to the N position, the ECU 11 detects that an N-range output from the shift position detection section 14 has been turned on (step S54; t22 in FIG. 8A). Further, when the driver performs an operation to switch the shift lever 13 from the N position to the R position (step S55; t23 in FIG. 8A), the ECU 11 detects that a no-contact state in which no range is detected has been established with the N-range output from the shift position detection section 14 turned off (step S56; t23 in FIG. 8A).

The ECU 11 instructs the secondary linear solenoid valve SLS to increase the secondary control pressure PSLS from the stand-by pressure Pa to the resisting pressure Pb (step S57; t23 in FIG. 8A). Consequently, the secondary control pressure PSLS is increased from the stand-by pressure Pa to the resisting pressure Pb, and supplied to the second working oil chamber 27b of the switching valve 27 to maintain the switching valve 27 in the non-reverse state (step S58).

When the operation to switch the shift lever 13 progresses, the spool 21p of the manual valve 21 is moved to the R range position (t24 in FIG. 8A), and supply of the reverse range pressure PR as the modulator pressure $P_{LPM2}$ from the output port 21c of the manual valve 21 is started (step S59). At this time, the secondary control pressure PSLS is supplied to the second working oil chamber 27b of the switching valve 27. Thus, the spool 27p is maintained in the non-reverse state by the secondary control pressure PSLS and the urging force of the spring 27s even if the reverse range pressure PR is supplied to the first working oil chamber 27a. When the shift lever 13 is switched to the R position, the ECU 11 detects that an R-range output from the shift position detection section 14 has been turned on (step S60; t25 in FIG. 8A).

The ECU 11 determines whether or not the vehicle speed is less than the second threshold SP2 in the case where the travel range is the reverse range (step S61). In the case where it is determined that the vehicle speed is not less than the second threshold SP2, the ECU 11 executes reverse prohibition control with the meshing clutch D1 kept disengaged. The determination as to whether or not the vehicle speed is less than the second threshold SP2 is made continuously while the travel range is the reverse range.

During the reverse prohibition control, when the driver performs an operation to switch the shift lever 13 from the R position to the N position (step S62; t26 in FIG. 8A), the ECU 11 detects that a no-contact state in which no range is detected has been established with the R-range output from the shift position detection section 14 turned off (step S63; t26 in FIG. 8A). When the operation to switch the shift lever 13 progresses, the spool 21p of the manual valve 21 is moved to the N range position (t27 in FIG. 8A), and supply of the reverse range pressure PR from the output port 21c of the manual valve 21 is stopped (step S64).

When the shift lever 13 is switched to the N position, the ECU 11 detects that an N-range output from the shift position detection section 14 has been turned on (step S65; t28 in FIG. 8A). Further, when the driver performs an operation to switch the shift lever 13 from the N position to the D position (step S66; t29 in FIG. 8A), the ECU 11 detects that a no-contact state in which no range is detected has been established with the N-range output from the shift position detection section 14 turned off (step S67; t29 in FIG. 8A).

When the operation to switch the shift lever 13 progresses, the spool 21p of the manual valve 21 is moved to the D range position (t30 in FIG. 8A), and supply of the forward range pressure PD as the modulator pressure $P_{LPM2}$ from the output port 21b of the manual valve 21 is started (step S68). When the shift lever 13 is switched to the D position, the ECU 11 detects that a D-range output from the shift position detection section 14 has been turned on (step S69; t31 in FIG. 8A).

The ECU 11 issues an instruction to reduce the secondary control pressure PSLS from the resisting pressure Pb to the stand-by pressure Pa by controlling the secondary linear solenoid valve SLS (step S70; t31 in FIG. 8A). Consequently, the secondary control pressure PSLS is reduced from the resisting pressure Pb to the stand-by pressure Pa, and the resisting pressure Pb is no longer supplied to the second working oil chamber 27b of the switching valve 27. However, the reverse range pressure PR is not supplied, and thus the switching valve 27 remains in the non-reverse state.

The ECU 11 increases the engagement pressure PSL2 by controlling the linear solenoid valve SL2 (step S71; t32 in FIG. 8A onward), and engages the second clutch C2 (step S72; t32 in FIG. 8A onward). Consequently, forward travel utilizing the second power transfer path a2 in the forward continuously-variable mode can be restored as in step S50 and earlier.

Figure 8B:
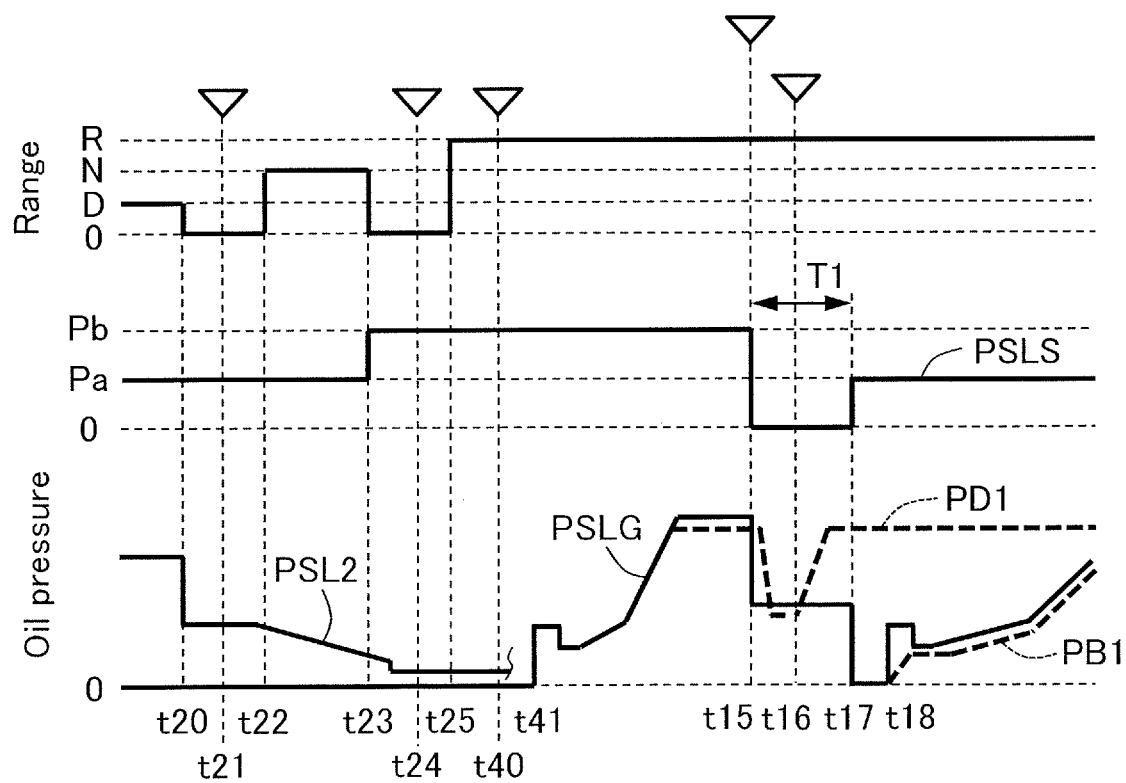
FIG. 8B is a time chart illustrating operation of the hydraulic control device according to the embodiment for a case where the reverse prohibition control is canceled with the vehicle speed becoming less than the second threshold.

In the case where it is determined in step S61 that the vehicle speed is less than the second threshold SP2 (t40 in FIG. 8B), on the other hand, the ECU 11 increases the engagement pressure PSLG by controlling the linear solenoid valve SLG (step S73; t41 in FIG. 8B onward), and engages the meshing clutch D1 (step S74; t41 in FIG. 8B onward). Further, the ECU 11 determines whether or not the vehicle speed is less than the first threshold SP1 (step S75). The determination as to whether or not the vehicle speed is less than the first threshold SP1 is made continuously while the travel range is the reverse range.

In the case where it is determined that the vehicle speed is not less than the first threshold SP1, the ECU 11 executes the processes in step S15 and the subsequent steps illustrated in FIG. 4 in order to execute the reverse prohibition control.

In the case where it is determined that the vehicle speed is less than the first threshold. SP1, meanwhile, the ECU 11 stops the reverse prohibition control, and executes the processes in step S30 and the subsequent steps illustrated in FIG. 5 to engage the meshing clutch D1 and the brake B1 in the reverse range and make reverse travel in the reverse non-continuously-variable mode.

As described above, the hydraulic control device 12 for the automatic transmission 10 according to the present embodiment can maintain the switching valve 27 in the non-reverse state by supplying the resisting pressure Pb from the secondary linear solenoid valve SLS while the vehicle speed is equal to or more than the first threshold SP1 and the travel range is switched to at least the reverse range. Therefore, the engagement pressure PSLG which is supplied from the linear solenoid valve SLG is supplied to the meshing clutch D1, and a hydraulic pressure in the brake B1 is drained. Thus, disengagement of the meshing clutch D1 and abrupt engagement of the brake B1 can be suppressed in the case where the shift lever 13 is switched to the reverse range during forward travel.

The automatic transmission described in WO 2013/176208 includes four engagement elements, namely the first clutch, the second clutch, the meshing clutch, and the brake, and the engagement elements are actuated by a hydraulic control device. In normal hydraulic control devices, one solenoid valve such as a linear solenoid valve is provided for each engagement element. Therefore, four solenoid valves are provided in order to control the four engagement elements discussed above. Here, it is conceivable to control a plurality of engagement elements by distributing a supplied pressure and a line pressure (or a modulator pressure) from one solenoid valve using a switching valve. With this configuration, the number of the solenoid valves can be reduced to be less than the number of the engagement elements.

However, in the case where the switching valve is frequently switched as in garage control, for example, and particularly in the case where a manual valve is used, there may occur variations in the time lag between mechanical switching of a spool of the manual valve and electrical switching of a position sensor when the shift lever is switched. In this case, an engagement element that should be maintained in the engaged state continuously before and after the switching of the switching valve may be disengaged, or an engagement element may be abruptly engaged along with the switching of the switching valve. In the case where an engagement element that should be continuously maintained in the engaged state is a meshing clutch, in particular, the processing speed may be lowered if the meshing clutch is disengaged, since it takes a long time for the meshing clutch to be re-engaged. In addition, the drivability may be impaired if an engagement element is abruptly engaged. Thus, it has been desired to suppress disengagement of a meshing clutch with a synchronization mesh mechanism and abrupt engagement of an engagement element at the time of switching of the switching valve while reducing the number of solenoid valves.

Figure 9:
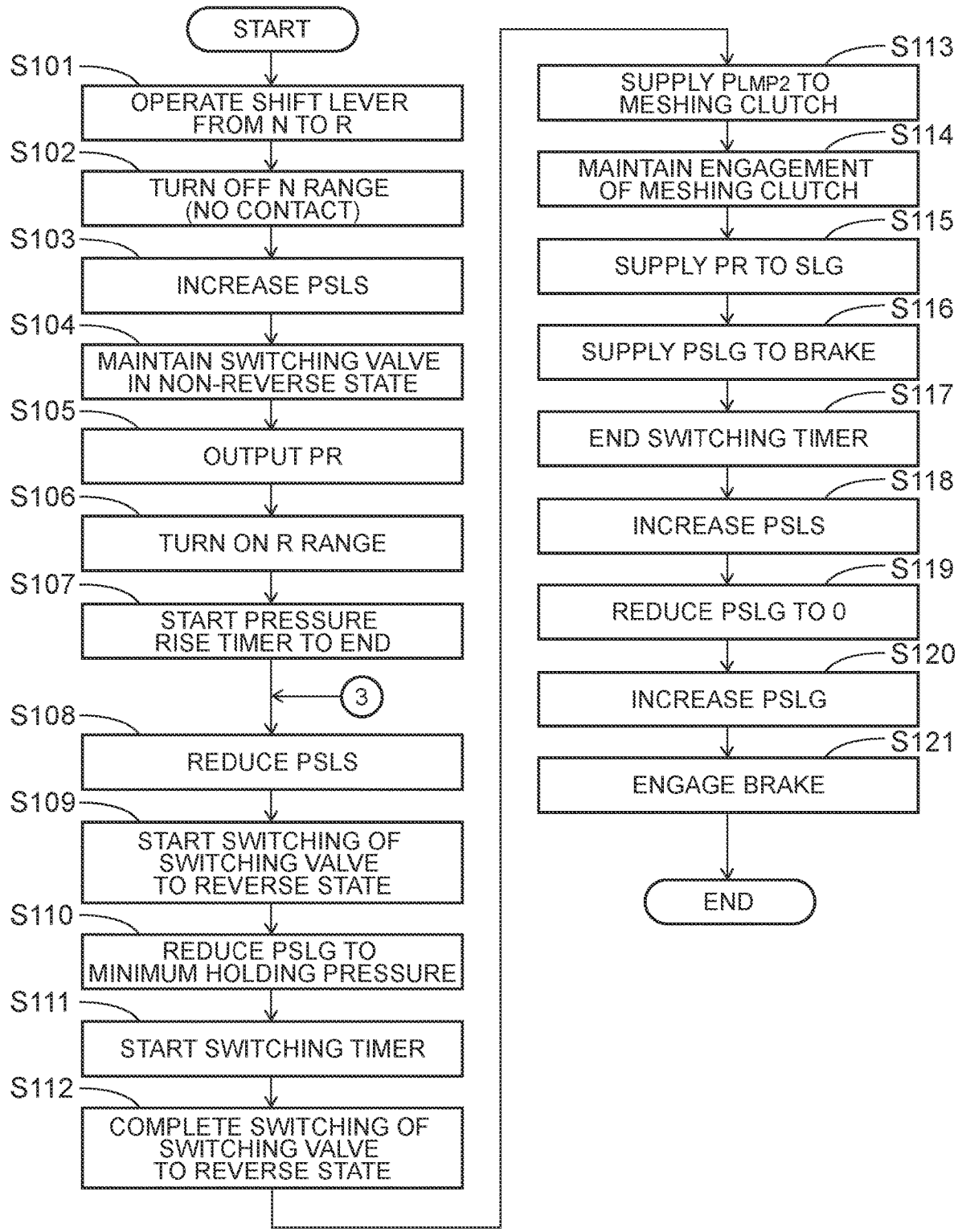
FIG. 9 is a flowchart for a case where a shift lever is operated from an N position to an R position during drive of an internal combustion engine in the hydraulic control device according to the embodiment.
Figure 11A:
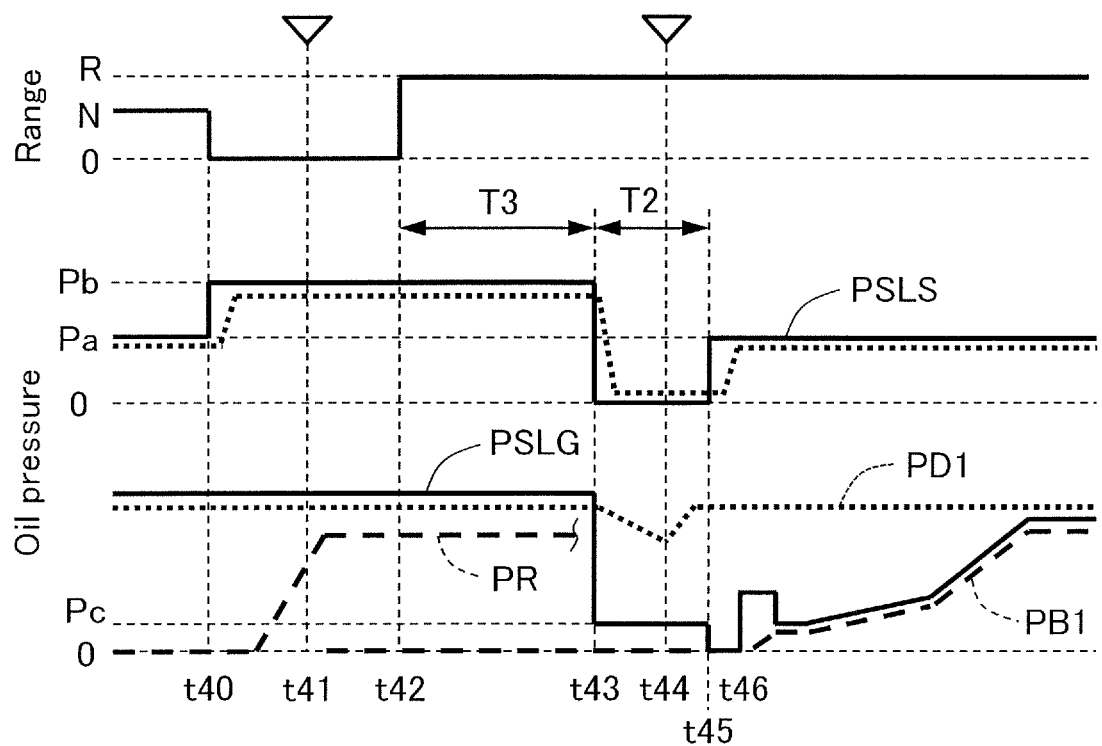
FIG. 11A is a time chart illustrating operation of the hydraulic control device according to the embodiment for a case where the shift lever is operated from the N position to the R position during drive of the internal combustion engine.

Thus, in the automatic transmission 10 according to the present embodiment, when the travel range is switched from a non-reverse range to the reverse range (step S101 in FIG. 9; see t40 in FIG. 11A), the ECU 11 maintains the switching valve 27 in the non-reverse state by supplying the secondary control pressure PSLS from the secondary linear solenoid valve SLS as the resisting pressure Pb (steps S103 to S104 in FIG. 9; see t40 in FIG. 11A), thereafter reduces the engagement pressure PSLG from the linear solenoid valve SLG (step S110 in FIG. 9; see t43 in FIG. 11A) and reduces the secondary control pressure PSLS from the secondary linear solenoid valve SLS (step S108 in FIG. 9; see t43 in FIG. 11A), switches the switching valve 27 to the reverse state within a second set time T2 (step S112 in FIG. 9; see t44 in FIG. 11A), and engages the brake B1 using the engagement pressure PSLG from the linear solenoid valve SLG after the lapse of the second set time T2 (steps S120 to S121 in FIG. 9; see t46 in FIG. 11A).

In addition, when the travel range is switched from a non-reverse range to the reverse range (step S101 in FIG. 9; see t40 in FIG. 11A), the ECU 11 maintains the switching valve 27 in the non-reverse state by supplying the secondary control pressure PSLS from the secondary linear solenoid valve SLS as the resisting pressure Pb (steps S103 to S104 in FIG. 9; see t40 in FIG. 11A) when the non-reverse range is turned off (step S102 in FIG. 9; see t40 in FIG. 11A), and reduces the engagement pressure PSLG from the linear solenoid valve SW (step S110 in FIG. 9; see t43 in FIG. 11A) and reduces the secondary control pressure PSLS from the secondary linear solenoid valve SLS (step S108 in FIG. 9; see t43 in FIG. 11A) when a third set time T3 elapses (step S107 in FIG. 9; see t42 to t43 in FIG. 11A) since the reverse range is turned on (step S106 in FIG. 9; t42 in FIG. 11A). The hydraulic pressure at the time when the engagement pressure PSLG from the linear solenoid valve SLG is reduced (step S110 in FIG. 9; see t43 to t45 in FIG. 11A) can be a minimum holding pressure (synchronization holding pressure) Pc, which is more than the urging force of the urging spring 59, which is less than the hydraulic pressure at which engagement of the brake B1 is started, and at which the meshing clutch D1 is kept in the engaged state.

Figure 10:
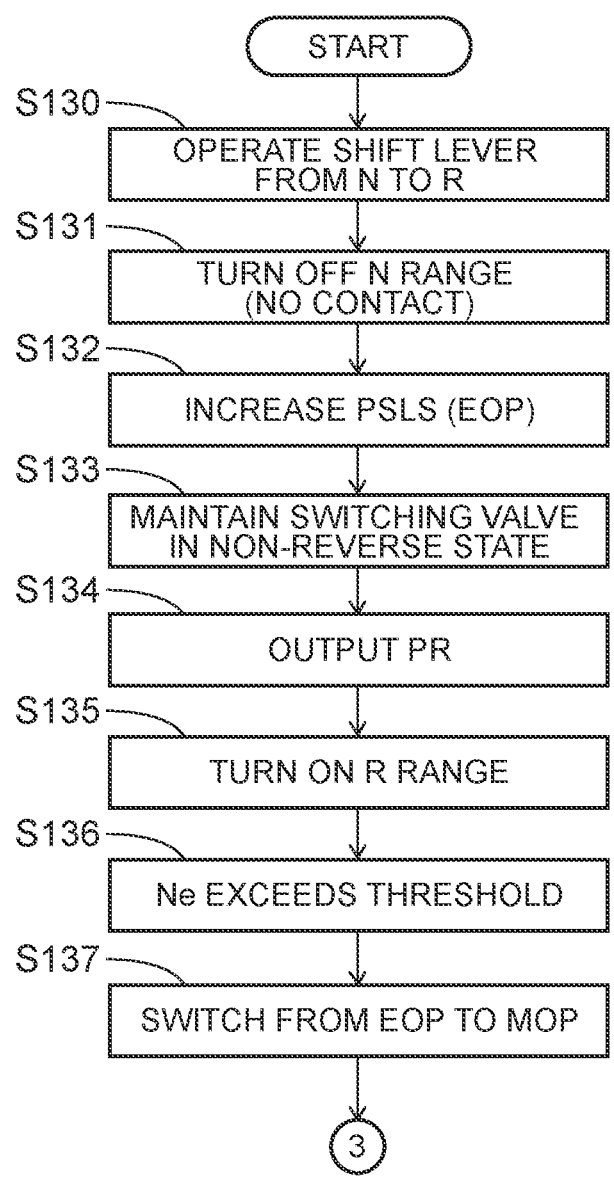
FIG. 10 is a flowchart for a case where the shift lever is operated from the N position to the R position during idle stop of the internal combustion engine in the hydraulic control device according to the embodiment.
Figure 11B:
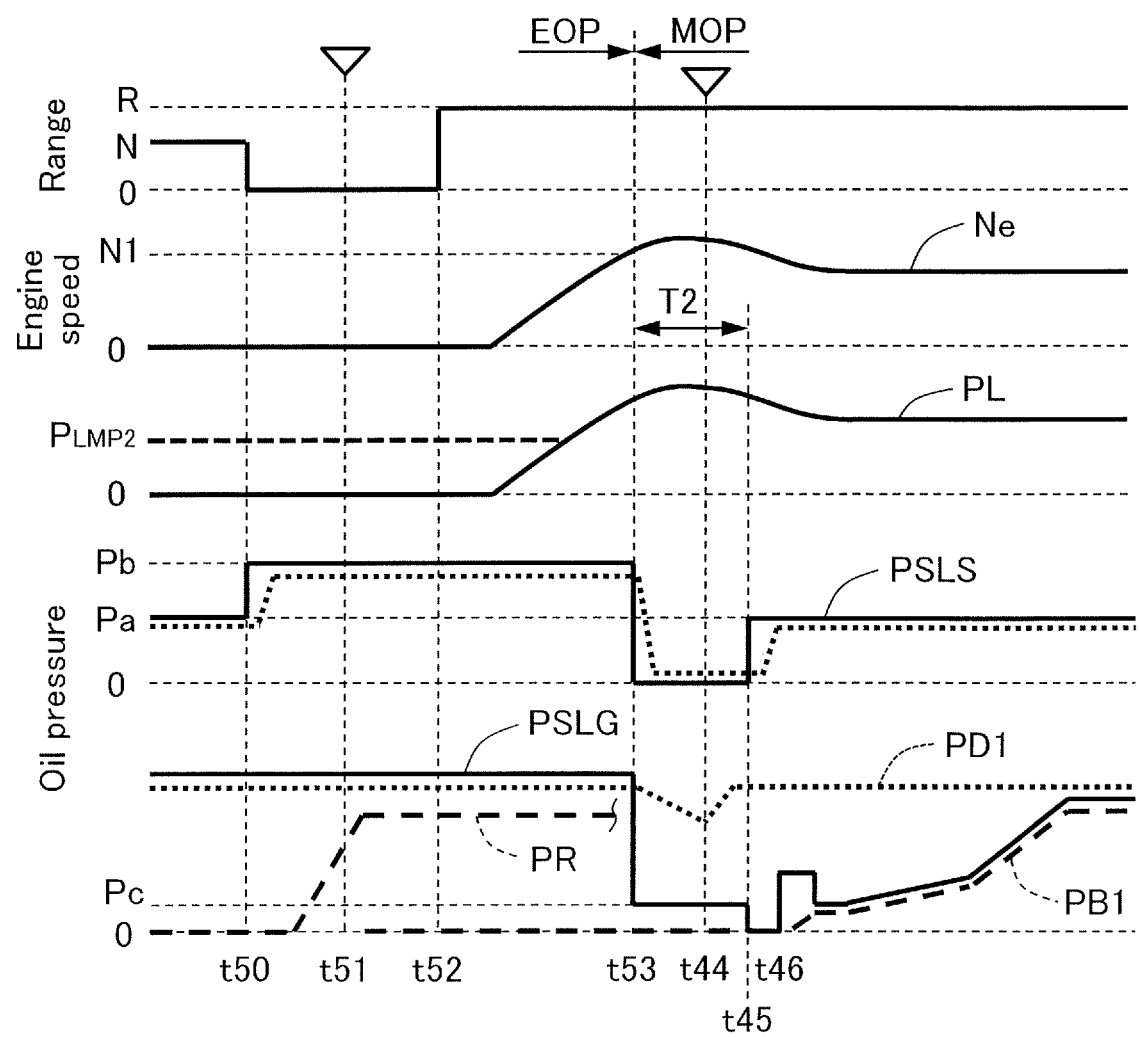
FIG. 11B is a time chart illustrating operation of the hydraulic control device according to the embodiment for a case where the shift lever is operated from the N position to the R position during idle stop of the internal combustion engine.

In addition, after the rotational speed Ne of the internal combustion engine 16 becomes more than a threshold N1 (step S136 in FIG. 10; see t53 in FIG. 11B) when the internal combustion engine 16 is started, the ECU 11 reduces the engagement pressure PSLG from the linear solenoid valve SLG (step S110 in FIG. 9; see t53 in FIG. 11B), and reduces the secondary control pressure PSLS from the secondary linear solenoid valve SLS (step S108 in FIG. 9; see t53 in FIG. 11B).

Figure 13:
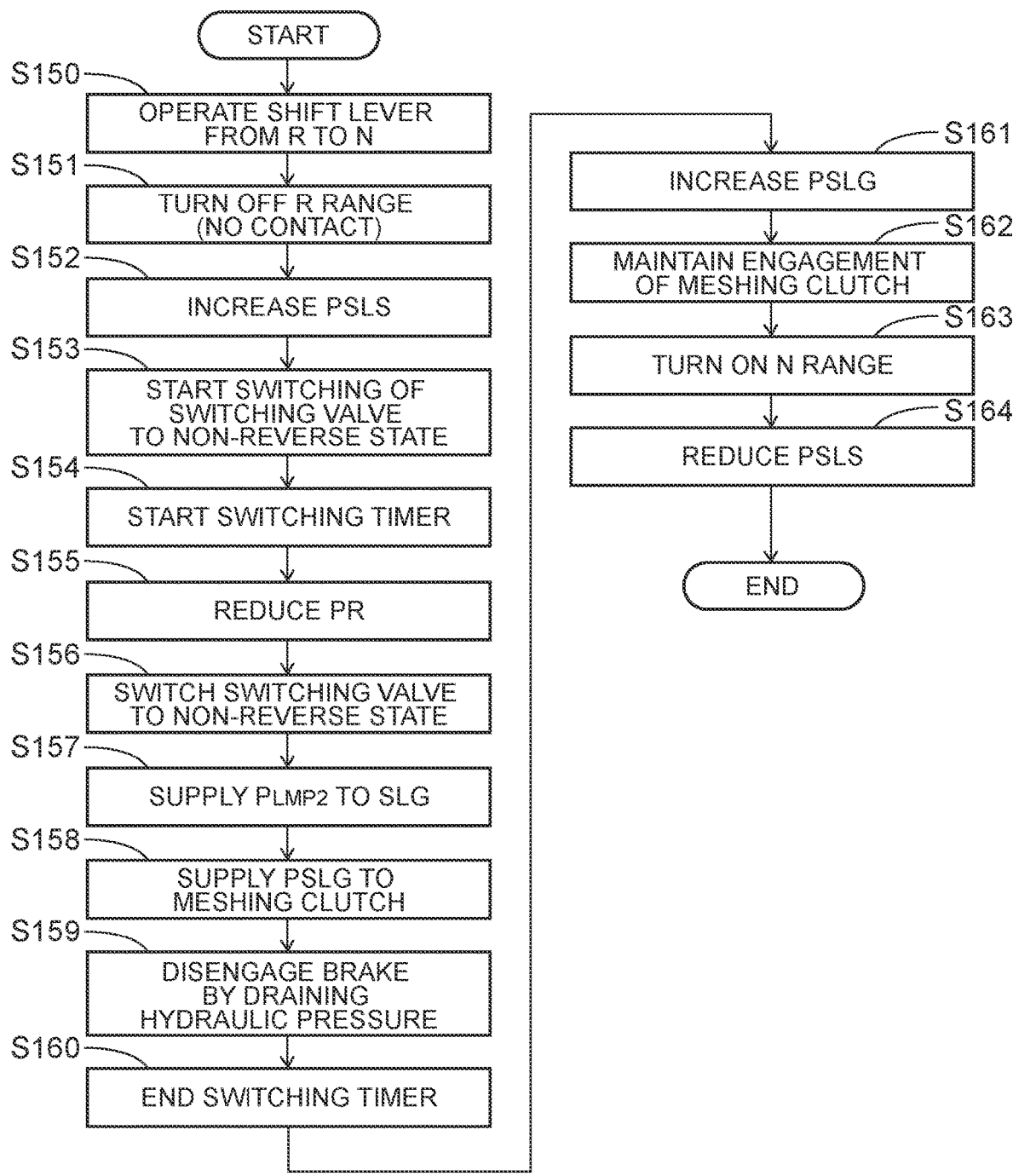
FIG. 13 is a flowchart for a case where the shift lever is operated from the R position to the N position in the middle of establishment of the reverse speed in the hydraulic control device according to the embodiment.
Figure 14A:
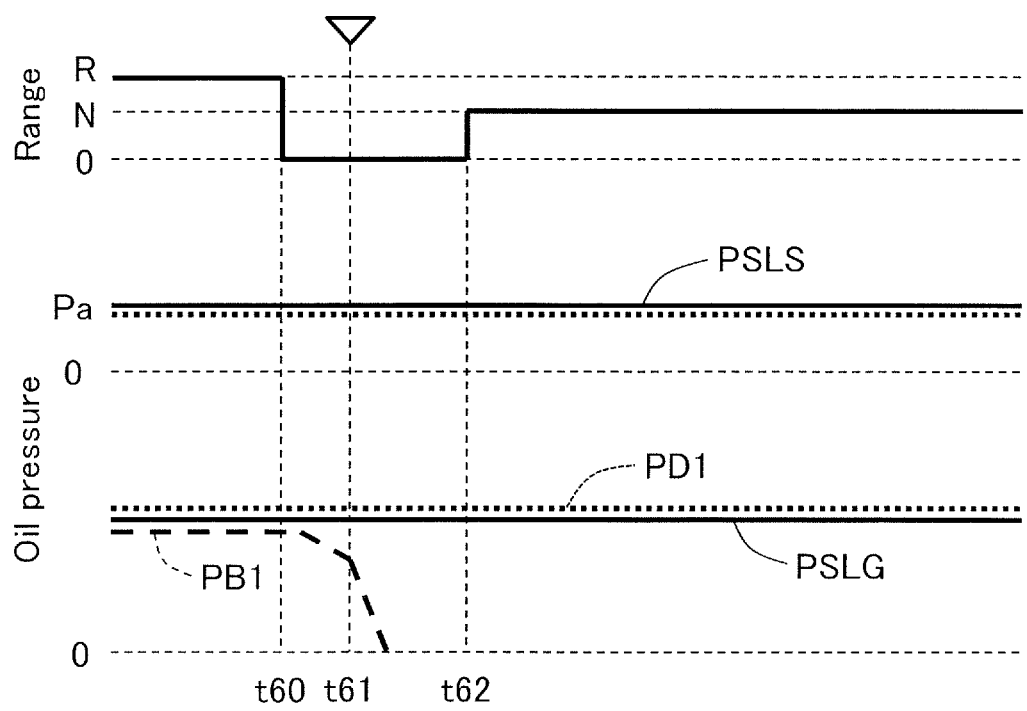
FIG. 14A is a time chart illustrating operation of the hydraulic control device according to the embodiment for a case where the shift lever is operated from the R position to the N position after establishment of the reverse speed.
Figure 14B:
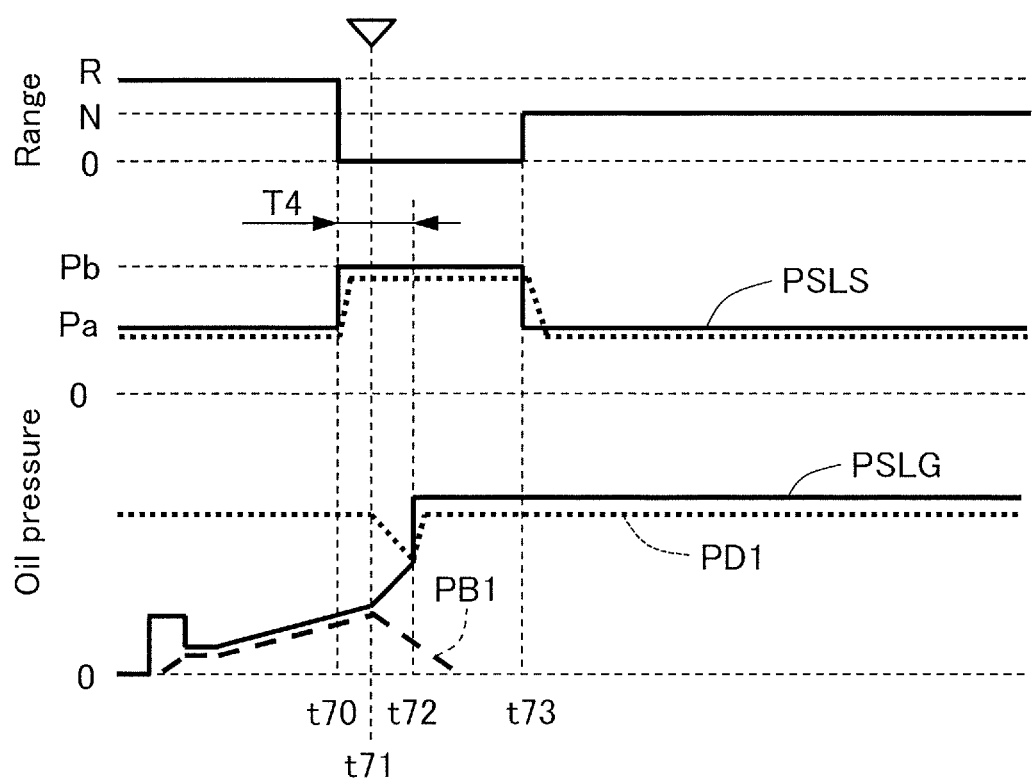
FIG. 14B is a time chart illustrating operation of the hydraulic control device according to the embodiment for a case where the shift lever is operated from the R position to the N position in the middle of establishment of the reverse speed.

In addition, when the travel range is switched from the reverse range to a non-reverse range (step S150 in FIG. 13; see t70 in FIG. 14B), the ECU 11 supplies the secondary control pressure PSLS from the secondary linear solenoid valve SLS as the resisting pressure Pb (step S152 in FIG. 13; see t70 in FIG. 14B), switches the switching valve 27 to the non-reverse state within a non-reverse switching time T4 since the supply (step S156 in FIG. 13; see t71 in FIG. 14B), and supplies the engagement pressure PSLG which is supplied from the linear solenoid valve SLG to the meshing clutch D1 after the lapse of the non-reverse switching time T4 (steps S161 to S162 in FIG. 13; see t72 in FIG. 14B). That is, the linear solenoid valve SLG can supply the engagement pressure PSLG for engagement of the meshing clutch D1 or the brake B1.

Operation of the hydraulic control device 12 for the automatic transmission 11) according to the present embodiment for a case where the garage control is performed with the shift lever 13 switched from the N position to the R position will be described with reference to the flowcharts illustrated in FIGS. 9 and 10 and the time charts illustrated in FIGS. 11A and 11B. Here, a case where the garage control is executed during drive of the internal combustion engine 16 (FIGS. 9 and 11A) and a case where the garage control is executed during idle stop of the internal combustion engine 16 (FIGS. 10 and 11B) will be described separately.

Here, operation for a case Where the garage control is performed with the shift lever 13 switched from the N position to the R position will be described. However, the same also applies to a case Where the garage control is performed with the shift lever 13 switched from a P position to the R position.

In FIGS. 11A, 11B, 14A, and 14B, the value of PSLS indicated by the solid line means an instruction value that the ECU 11 outputs to the secondary linear solenoid valve SLS in order to supply the secondary control pressure PSLS, and is slightly different from the actual secondary control pressure PSLS indicated by the parallel dotted line. Similarly, the value of PSLG indicated by the solid line means an instruction value that the ECU 11 outputs to the linear solenoid valve SLG in order to supply the engagement pressure PSLG, and is slightly different from an actual engagement pressure PD1 for the meshing clutch D1 and an actual engagement pressure PB1 for the brake B1 indicated by the parallel dotted lines. A case where the shift lever 13 is kept in the R position after being switched from the N position to the R position will be described below. It is a matter of course that, in the case where the shift lever 13 is switched to a different position after being switched to the R position, for example, processes that match the position after the switching are performed.

First, a case where the garage control is executed during drive of the internal combustion engine 16 will be described. Here, it is assumed that a predetermined time has elapsed after the start of the internal combustion engine 16, the line pressure PL and the modulator pressure $P_{LPM2}$ are desired pressures, and the shift lever 13 is in the N position. At this time, neither of the forward range pressure PD and the reverse range pressure PR is output from the manual valve 21, and the switching valve 27 is in the non-reverse state. Therefore, the meshing clutch D1 is engaged by the engagement pressure PSLG using the modulator pressure $P_{LPM2}$ as the source pressure, and the brake B1 is in the drained state. In addition, the secondary control pressure PSLS is at the stand-by pressure Pa at which the belt 43 (see FIG. 1) does not slip. The internal combustion engine 16 is driven, and thus the source pressure for the line pressure PL is supplied from the mechanical oil pump 18.

As illustrated in FIG. 9, the driver starts an operation to switch the shift lever 13 from the N position to the R position (step S101; t40 in FIG. 11A). When the operation to switch the shift lever 13 is started, the ECU 11 detects that a no-contact state in which no range is detected has been established with the N-range output from the shift position detection section 14, which has been detected so far, turned off (step S102; t40 in FIG. 11A). The ECU 11 instructs the secondary linear solenoid valve SLS to increase the secondary control pressure PSLS from the stand-by pressure Pa to the resisting pressure Pb (step S103; t40 in FIG. 11A). Consequently, the secondary control pressure PSLS is increased from the stand-by pressure Pa to the resisting pressure Pb, and supplied to the second working oil chamber 27b of the switching valve 27 to maintain the switching valve 27 in the non-reverse state (step S104).

When the operation to switch the shift lever 13 progresses, the spool 21p of the manual valve 21 is moved to the R range position (t41 in FIG. 11A), and the modulator pressure $P_{LPM2}$ is output from the output port 21c of the manual valve 21 as the reverse range pressure PR (step S105). At this time, the secondary control pressure PSLS is supplied to the second working oil chamber 27b of the switching valve 27. Thus, the spool 27p is maintained in the non-reverse state by the secondary control pressure PSLS and the urging force of the spring 27s even if the reverse range pressure PR is supplied to the first working oil chamber 27a.

When the shift lever 13 is switched to the R position, the ECU 11 detects that an R-range output from the shift position detection section 14 has been turned on (step S106; t42 in FIG. 11A). The ECU 11 starts a pressure rise timer, and stands by for the third set time T3 (step S107; t42 to t43 in FIG. 11A). The secondary control pressure PSLS is raised sufficiently during the third set time T3.

After the pressure rise timer is ended, the ECU 11 drains a hydraulic pressure from the secondary linear solenoid valve SLS, and issues an instruction to reduce the secondary control pressure PSLS from the resisting pressure Pb to substantially zero (step S108; t43 in FIG. 11A). Consequently, the secondary control pressure PSLS is reduced from the resisting pressure Pb to substantially zero, and the resisting pressure Pb is no longer supplied to the second working oil chamber 27b of the switching valve 27, which starts switching of the switching valve 27 to the reverse state using the reverse range pressure PR (step S109). In addition, after the pressure rise timer is ended, the ECU 11 issues an instruction to reduce the engagement pressure PSLG from the maximum pressure to the minimum holding pressure Pc for the meshing clutch D1 by controlling the linear solenoid valve SLG (step S110; t43 in FIG. 11A). The minimum holding pressure Pc here is a hydraulic pressure that is in the range of more than the urging force of the urging spring 59 and less than a hydraulic pressure at which engagement of the brake B1 is started and that is the lowest possible pressure at which the meshing clutch D1 is kept in the engaged state. Consequently, the meshing clutch D1 is kept in the engaged state during the third set time T3. Here, the ECU 11 issues an instruction to reduce the engagement pressure PSLG from the maximum pressure to the minimum holding pressure Pc for the meshing clutch D1 after the pressure rise s ended. However, the present disclosure is not limited thereto, and the ECU 11 may issue an instruction to reduce the engagement pressure PSLG to a hydraulic pressure that is higher than the minimum holding pressure Pc.

After the pressure rise timer is ended, the ECU 11 starts a switching timer (step S111; t43 in FIG. 11A). The switching timer is configured to switch the switching valve 27 before the second set time T2 elapses since the start. In the present embodiment, the ECU 11 sequentially reduces the secondary control pressure PSLS (step S108), reduces the engagement pressure PSLG (step S110), and starts the switching tinier (step S111) after the pressure rise timer is ended. However, the present disclosure is not limited thereto, and such steps may be executed in a different order, or may be executed concurrently.

Switching of the switching valve 27 to the reverse state by the reverse range pressure PR is completed before the second set time T2 elapses since the switching timer is started (step S112; t44 in FIG. 11A). Consequently, the modulator pressure $P_{LPM2}$ is supplied to the hydraulic servo 93 for the meshing clutch D1 (step S113; t44 in FIG. 11A onward), and the meshing clutch D1 is maintained in the engaged state (step S114; t44 in FIG. 11A onward). In addition, when the switching valve 27 is switched to the reverse state, the reverse range pressure PR is supplied to the linear solenoid valve SLG (step S115; t44 in FIG. HA onward), and the engagement pressure PSLG is supplied to the hydraulic servo 94 for the brake B1 from which a hydraulic pressure has been drained (step S116; t44 in FIG. 11A onward). Here, during operation of the switching timer, the engagement pressure PSLG at the minimum holding pressure Pc is output from the linear solenoid valve SLG. Therefore, the minimum holding pressure Pc is supplied to the hydraulic servo 94 for the brake B1 when the switching valve 27 is switched to the reverse state. Since the minimum holding pressure Pc is much lower than the engagement pressure for the brake B1, however, the brake B1 is not abruptly engaged.

After that, the ECU 11 ends the switching timer when the second set time T2 elapses since the switching timer is started (step S117; t45 in FIG. 11A). After the switching timer is ended, the ECU 11 instructs the secondary linear solenoid valve SLS to increase the secondary control pressure PSLS to the stand-by pressure Pa (step S118; t45 in FIG. 11A). Consequently, the secondary control pressure PSLS is increased to the stand-by pressure Pa, which prevents the belt 43 (see FIG. 1) from slipping. After the switching timer is ended, the ECU 11 issues an instruction to reduce the engagement pressure PSLG from the minimum holding pressure Pc to substantially zero by draining a hydraulic pressure from the linear solenoid valve SLG (step S119; t45 in FIG. 11A). The ECU 11 is not limited to draining a hydraulic pressure from the linear solenoid valve SLG after the switching timer is ended, and may execute fast fill by increasing the engagement pressure PSLG from the minimum holding pressure Pc without draining a hydraulic pressure, for example. Further, the ECU 11 increases the engagement pressure PSLG by controlling the linear solenoid valve SLG (step S120; t46 in FIG. 11A onward), and engages the brake B1 (step S121; t46 in FIG. 11A onward). In the present embodiment, the ECU 11 sequentially increases the secondary control pressure PSLS (step S118) and reduces the engagement pressure PSLG (step S119) after the pressure rise timer is ended. However, the present disclosure is not limited thereto, and such steps may be executed in the opposite order, or may be executed concurrently.

A case where the secondary control pressure PSLS is not supplied to the switching valve 27 when the travel range is switched from the N range to the R range, unlike the hydraulic control device 12 for the automatic transmission 10 according to the present embodiment, will be described below. In this case, if a hydraulic pressure is drained from the linear solenoid valve SLG when the ECU 11 detects that the N-range output is turned off because of switching of the shift lever 13, the meshing clutch D1 may be disengaged before the switching valve 27 is actually switched to the reverse state, which may require a long time for re-engagement. Alternatively, if an output of the engagement pressure PSLG for the meshing clutch D1 from the linear solenoid valve SLG is maintained, even if the ECU 11 detects that the N-range output is turned off because of switching of the shill lever 13, the engagement pressure PSLG may be supplied to the hydraulic servo 94 for the brake B1 after the switching valve 27 is actually switched to the reverse state, which may abruptly engage the brake With the hydraulic control device 12 for the automatic transmission 10 according to the present embodiment, in contrast, the switching valve 27 is maintained in the non-reverse state by supplying the secondary control pressure PSLS from the secondary linear solenoid valve SLS as the resisting pressure Pb when the travel range is switched from the N range to the R range, and thereafter the timings of switching of the switching valve 27 to the reverse state and supply of the engagement pressure PSLG from the linear solenoid valve SLG can be caused to coincide with each other within the second set time T2. Consequently, unnecessary disengagement of the meshing clutch D1 and abrupt engagement of the brake B1 at the time of switching of the switching valve 27 can be suppressed while reducing the number of solenoid valves.

Next, a case where the garage control is executed during idle stop of the internal combustion engine 16 will be described. Here, idle of the internal combustion engine 16 is stopped and the mechanical oil pump 18 is not operating, and therefore the source pressure for the line pressure PL is supplied from the electric oil pump 19. The state is otherwise the same as the state before t40 in FIG. 11A, and thus will not be described in detail.

As illustrated in FIG. 10, the driver starts an operation to switch the shift lever 13 from the N position to the R position (step S130; t50 in FIG. 11B). When the operation to switch the shift lever 13 is started, the ECU 11 detects that a no-contact state in which no range is detected has been established with the N-range output from the shift position detection section 14, which has been detected so far, turned off (step S131; t50 in FIG. 11B). The ECU 11 instructs the secondary linear solenoid valve SLS to increase the secondary control pressure PSLS from the stand-by pressure Pa to the resisting pressure Pb (step S132; t50 in FIG. 11B). Here, the secondary control pressure PSLS is generated from the source pressure which is supplied from the electric oil pump 19. Consequently, the secondary control pressure PSLS is increased from the stand-by pressure Pa to the resisting pressure Pb, and supplied to the second working oil chamber 27b of the switching valve 27 to maintain the switching valve 27 in the non-reverse state (step S133).

When the operation to switch the shift lever 13 progresses, the spool 21p of the manual valve 21 is moved to the R range position (t51 in FIG. 11B), and the modulator pressure $P_{LPM2}$ is output from the output port 21c of the manual valve 21 as the reverse range pressure PR (step S134). At this time, the secondary control pressure PSLS is supplied to the second working oil chamber 27b of the switching valve 27. Thus, the spool 27p is maintained in the non-reverse state by the secondary control pressure PSLS and the urging force of the spring 27s even if the reverse range pressure PR is supplied to the first working oil chamber 27a.

When the shift lever 13 is switched to the R position, the ECU 11 detects that an R-range output from the shift position detection section 14 has been turned on (step S135; t52 in FIG. 11B). The ECU 11 receives the rotational speed Ne of the crankshaft of the internal combustion engine 16 from the engine rotational speed detection section, and determines whether or not the rotational speed Ne exceeds the predetermined threshold N1. In the case where the rotational speed Ne exceeds the predetermined threshold N1 (step S136; t53 in FIG. 11B), it is determined that the discharge pressure of the mechanical oil pump 18 is sufficiently high. Then, the ECU 11 switches the supply source of the source pressure to be supplied to the hydraulic control device 12 from the electric oil pump 19 to the mechanical oil pump 18 (step S137; t53 in FIG. 11B). After that, the ECU 11 executes processes that are similar to those in step S108 and the subsequent steps in FIG. 9. Thus, such processes will not be described in detail.

Next, operation of the hydraulic control device 12 for the automatic transmission 10 for a case Where the garage control is performed with the shift lever 13 switched from the R position to the N position will be described with reference to the flowcharts illustrated in FIGS. 12 and 13 and the time charts illustrated in FIGS. 14A and 14B. Here, a case where the garage control is executed after establishment of the reverse speed (FIGS. 12 and 14A) and a case where the garage control is executed in the middle of establishment of the reverse speed (FIGS. 13 and 14B) will be described separately. Here, operation for a case where the garage control is performed with the shift lever 13 switched from the R position to the N position will be described. However, the same also applies to a case where the garage control is performed with the shift lever 13 switched from the R position to the P position.

First, a case where the garage control is executed after establishment of the reverse speed will be described. Here, the shift lever 13 is in the R position, the reverse range pressure PR is output from the manual valve 21, and the switching valve 27 is in the reverse state. Therefore, the meshing clutch D1 is engaged by the modulator pressure $P_{LPM2}$, and the brake B1 is engaged by the engagement pressure PSLG using the reverse range pressure PR as the source pressure. In addition, the secondary control pressure PSLS is at the stand-by pressure Pa at which the belt 43 (see FIG. 1) does not slip. The ECU 11 detects the ratio of the engine rotational speed Ne and the rotational speed of the output shaft 60, and detects whether or not the speed ratio of the reverse speed has been achieved. If the speed ratio of the reverse speed has been achieved, the present process is executed.

Figure 12:
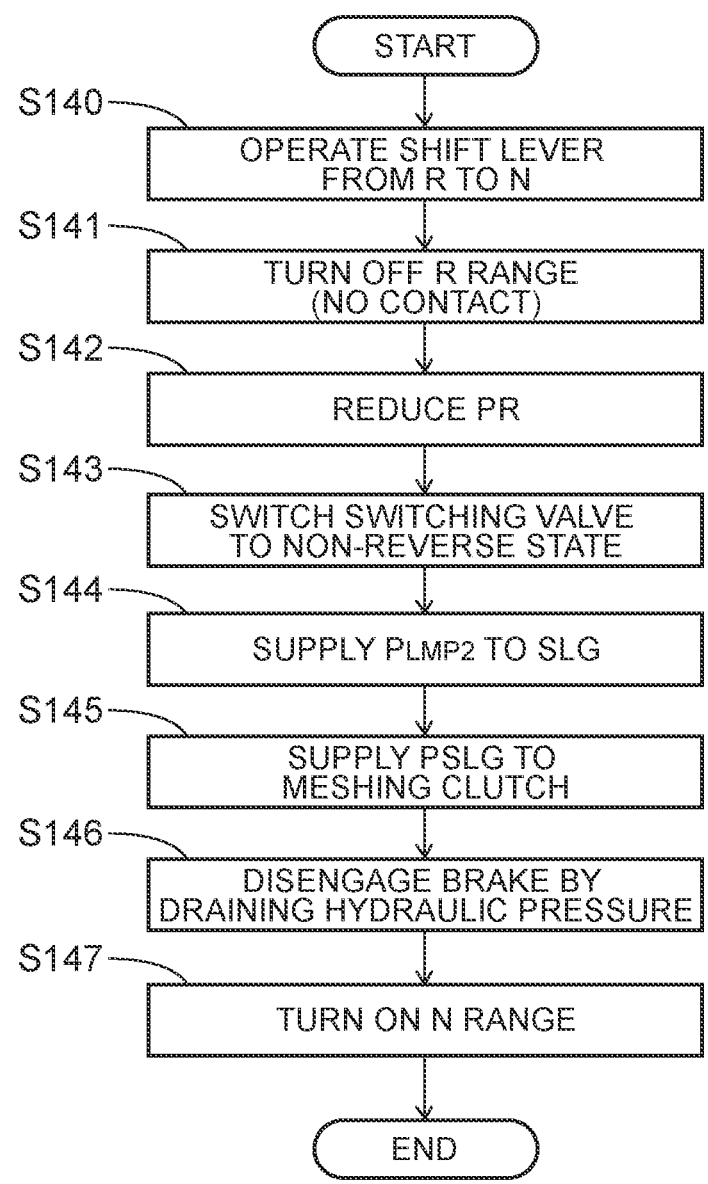
FIG. 12 is a flowchart for a case where the shift lever is operated from the R position to the N position after establishment of a reverse speed in the hydraulic control device according to the embodiment.

As illustrated in FIG. 12, the driver starts an operation to switch the shift lever 13 from the R position to the N position (step S140; t60 in FIG. 14A). When the operation to switch the shift lever 13 is started, the ECU 11 detects that a no-contact state in which no range is detected has been established with the R-range output from the shift position detection section 14, which has been detected so far, turned off (step S141; t60 in FIG. 14A). When the operation to switch the shift lever 13 progresses, the spool 21p of the manual valve 21 is moved to the N range position (t61 in FIG. 14A), and the reverse range pressure PR which is output from the output port 21c of the manual valve 21 is reduced (step S142). In addition, the switching valve 27 is switched to the non-reverse state along with the reduction in the reverse range pressure PR (step S143; t61 in FIG. 14A).

When the switching valve 27 is switched to the non-reverse state, the modulator pressure $P_{LPM2}$ is supplied to the linear solenoid valve SLG (step S144; t61 in FIG. 14A onward), and the engagement pressure PSLG is supplied to the hydraulic servo 93 for the meshing clutch D1 (step S145; t61 in FIG. 14A onward). In addition, when the switching valve 27 is switched to the non-reverse state, a hydraulic pressure is drained from the hydraulic servo 94 for the brake B1, and the brake B1 is disengaged (step S146; t61 in FIG. 14A onward). After that, when the shift lever 13 is switched to the N position, the ECU 11 detects that an N-range output from the shift position detection section 14 has been turned on (step S147; t62 in FIG. 14A).

Next, a case where the garage control is executed in the middle of establishment of the reverse speed will be described. This case is different from a case where the garage control is executed after establishment of the reverse speed discussed above in that the brake 131 is in the middle of being engaged. The ECU 11 detects the ratio of the engine rotational speed Ne and the rotational speed of the output shaft 60, and detects whether or not the speed ratio of the reverse speed has been achieved. If the speed ratio of the reverse speed has not been achieved, the present process is executed.

As illustrated in FIG. 13, the driver starts an operation to switch the shift lever 13 from the R position to the N position (step S150; t70 in FIG. 14B). When the operation to switch the shift lever 13 is started, the ECU 11 detects that a no-contact state in which no range is detected has been established with the R-range output from the shift position detection section 14, which has been detected so far, turned off (step S151; t70 in FIG. 14B). The ECU 11 instructs the secondary linear solenoid valve SLS to increase the secondary control pressure PSLS from the stand-by pressure Pa to the resisting pressure Pb (step S152; t70 in FIG. 14B). Consequently, the secondary control pressure PSLS is increased from the stand-by pressure Pa to the resisting pressure Pb, and supplied to the second working oil chamber 27b of the switching valve 27 to start switching of the switching valve 27 to the non-reverse state (step S153; t70 in FIG. 14B).

After detecting the R-range output being turned off, the ECU 11 starts a switching timer (step S154; t70 in FIG. 14B). The switching timer is configured to switch the switching valve 27 before the non-reverse switching time T4 elapses since the start. In the present embodiment, the ECU 11 sequentially increases the secondary control pressure PSLS (step S152) and starts the switching timer (step S154) after detecting the R-range output being turned off. However, the present disclosure is not limited thereto, and such steps may be executed in the opposite order, or may be executed concurrently.

When the operation to switch the shift lever 13 progresses, the spool 21p of the manual valve 21 is moved to the N range position (t71 in FIG. 14B), and the reverse range pressure PR which is output from the output port 21c of the manual valve 21 is reduced (step S155). After that, the switching valve 27 is switched to the nom-reverse state (step S156; t71 in FIG. 14B). When the switching valve 27 is switched to the non-reverse state, the modulator pressure $P_{LPM2}$ is supplied to the linear solenoid valve SLG (step S157; t71 in FIG. 14B onward), and the engagement pressure PSLG is supplied to the hydraulic servo 93 for the meshing clutch D1 (step S158; t71 in FIG. 14B onward). In addition, when the switching valve 27 is switched to the non-reverse state, a hydraulic pressure is drained from the hydraulic servo 94 for the brake 131, and the brake B1 is disengaged (step S159; t71 in FIG. 14B onward).

The ECU 11 ends the switching timer when the non-reverse switching time T4 elapses since the switching timer is started (step S160; t72 in FIG. 14B). The ECU 11 increases the engagement pressure PSLG by controlling the linear solenoid valve SLG (step S161; t72 in FIG. 14B), and maintains the meshing clutch D1 in the engaged state (step S162; t72 in FIG. 14B onward).

After that, when the shift lever 13 is switched to the N position, the ECU 11 detects that an N-range output from the shift position detection section 14 has been turned on (step S163; t73 in FIG. 14B). The ECU 11 issues an instruction to reduce the secondary control pressure PSLS from the resisting pressure Pb to the stand-by pressure Pa by controlling the secondary linear solenoid valve SLS (step S164; t73 in FIG. 14B).

A case where the garage control is executed in the middle of establishment of the reverse speed and the secondary control pressure PSLS is not supplied to the switching valve 27 when the travel range is switched from the R range to the N range, unlike the hydraulic control device 12 for the automatic transmission 10 according to the present embodiment, will be described below. In this case, if the engagement pressure PSLG is abruptly output from the linear solenoid valve SLG when the ECU 11 detects that the R-range output is turned off because of switching of the shift lever 13, the engagement pressure PSLG may be supplied to the hydraulic servo 94 for the brake B1 before the switching valve 27 is actually switched to the reverse state, which may abruptly engage the brake 131. Alternatively, if the engagement pressure PSLG which is output from the linear solenoid valve SLG is kept low even if the ECU 11 detects that the R-range output is turned off because of switching of the shift lever 13, the meshing clutch D1 may be disengaged after the switching valve 27 is actually switched to the reverse state, which may require a long time for re-engagement. With the hydraulic control device 12 for the automatic transmission 10 according to the present embodiment, in contrast, the ECU 11 can cause the timings of switching of the switching valve 27 to the non-reverse state and supply of the engagement pressure PSLG from the linear solenoid valve SLG to coincide each other within the non-reverse switching time T4. Consequently, unnecessary disengagement of the meshing clutch D1 and abrupt engagement of the brake B1 at the time of switching of the switching valve 27 can be suppressed.

With the hydraulic control device 12 for the automatic transmission 10 according to the present embodiment, as has been described above, the switching valve 27 is maintained in the non-reverse state by supplying the secondary control pressure PSLS from the secondary linear solenoid valve SLS as the resisting pressure Pb when the travel range is switched from the non-reverse range to the reverse range, and thereafter the timings of switching of the switching valve 27 to the reverse state and supply of the engagement pressure PSLG from the linear solenoid valve SLG can be caused to coincide with each other within the second set time T2. Consequently, unnecessary disengagement of the meshing clutch D1 and abrupt engagement of the brake 131 at the time of switching of the switching valve 27 can be suppressed while reducing the number of solenoid valves.

In the embodiment discussed above, the secondary control pressure PSLS is applied as the resisting pressure for the reverse range pressure PR in the switching valve 27. However, the present disclosure is not limited thereto. For example, if the hydraulic control device 12 has a linear solenoid valve SLU for lock-up and a lock-up relay valve, a supplied pressure PSLU from the linear solenoid valve SLU may be applied as the resisting pressure. Alternatively, a primary control pressure PSLP to be supplied from a primary linear solenoid valve SLP to the primary pressure control valve may be applied as the resisting pressure. Besides, a supplied pressure from the linear solenoid valve SLT may also be applied.

In the present embodiment discussed above, the meshing clutch D1 has the urging spring 59, and the engaged state is not maintained but the disengaged state is established by not supplying a hydraulic pressure to the hydraulic servo 93. However, the present disclosure is not limited thereto. The meshing clutch D1 may be of an on-lock type that has a lock mechanism that can maintain the engaged state even if a hydraulic pressure is no longer supplied after engagement.

In the present embodiment discussed above, in addition, the linear solenoid valve SLG is a valve that supplies an engagement pressure to the meshing clutch D1 and the brake B1. However, the present disclosure is not limited thereto. The linear solenoid valve SLG may be another linear solenoid valve or a solenoid valve that performs duty control.

In the present embodiment discussed above, in addition, the automatic transmission 10 has the continuously variable speed change mechanism 4. However, the present disclosure is not limited thereto. For example, the automatic transmission 10 may not have the continuously variable speed change mechanism 4, but have a multi-speed speed change mechanism provided in at least one of the first power transfer path a1 and the second power transfer path a2.

In the present embodiment discussed above, in addition, the automatic transmission 10 has two power transfer paths, namely the first power transfer path a1 and the second power transfer path a2. However, the present disclosure is not limited thereto. For example, the automatic transmission 10 may have only one power transfer path in which the meshing clutch D1 and an engagement element are provided.

In the present embodiment discussed above, in addition, the manual valve 21 is applied as the range pressure supply section. However, the present disclosure is not limited thereto, and a shift-by-wire range pressure supply section may also be applied.

The present embodiment includes at least the following configuration. The present embodiment provides a hydraulic control device (12) for an automatic transmission (10) including: an input shaft (2) drivably coupled to a drive source (16) of a vehicle (1); an output shaft (60) drivably coupled to wheels; a power transfer path (a1, a2) that couples the input shaft (2) and the output shaft (60) to each other; a meshing clutch (D1) with a synchronization mesh mechanism that is provided in the power transfer path (a1, a2) and that allows power transfer when supplied with a hydraulic pressure; and an engagement element (B1) that is provided in the power transfer path (a1, a2) and that allows power transfer with rotation from the input shaft (2) reversed when supplied with a hydraulic pressure, the automatic transmission (10) being configured to transfer rotation by connecting the input shaft (2) and the output shaft (60) to each other through the power transfer path (a1, a2) when the meshing clutch (D1) and the engagement element (B1) are brought into an engaged state, and the hydraulic control device (12) being configured to supply and discharge a hydraulic pressure to and from the meshing clutch (D1) and the engagement element (B1). The hydraulic control device (12) includes: a source pressure generation section (20) that generates a source pressure ($P_{LPM2}$); a range pressure supply section (21) that supplies a reverse range pressure (PR) in the case where a shift speed is a reverse speed; a first solenoid valve (SLG) that is capable of supplying an engagement pressure (PSLG) for engagement of the meshing clutch (D1) or the engagement element (B1); a switching valve (27) that is switchable in accordance with the reverse range pressure (PR), the switching valve (27) being switched to a non-reverse state in which the engagement pressure (PSLG) which is supplied from the first solenoid valve (SLG) is supplied to the meshing clutch (D1) and a hydraulic pressure in the engagement element (B1) is drained in the case where the reverse range pressure (PR) is not supplied, and switched to a reverse state in which the engagement pressure (PSLG) which is supplied from the first solenoid valve (SLG) is supplied to the engagement element (B1) and the source pressure ($P_{LPM2}$) is supplied to the meshing clutch (D1) in the case where the reverse range pressure (PR) is supplied; and a second solenoid valve (SLS) that is capable of supplying a resisting pressure (Pb) that maintains the switching valve (27) in the non-reverse state against the reverse range pressure (PR), in which the switching valve (27) is maintained in the non-reverse state by supplying the resisting pressure (Pb) from the second solenoid valve (SLS) while a travel range is switched to at least a reverse range during forward travel. With this configuration, the switching valve (27) can be maintained in the non-reverse state by supplying the resisting pressure (Pb) from the second solenoid valve (SLS) while the travel range is switched to at least the reverse range during forward travel. Therefore, the engagement pressure (PSLG) which is supplied from the first solenoid valve (SLG) is supplied to the meshing clutch (D1), and a hydraulic pressure in the engagement element (B1) is drained. Thus, disengagement of the meshing clutch (D1) and abrupt engagement of the engagement element (B1) can be suppressed in the case where the shift lever (13) is switched to the reverse range during forward travel.

In the hydraulic control device (12) for the automatic transmission (10) according to the present embodiment, in addition, the power transfer path (a1, a2) has a first power transfer path (a1) in which the meshing clutch (D1) and the engagement element (B1) are provided and through which the input shaft (2) and the output shaft (60) can be coupled to each other during forward travel and reverse travel, and a second power transfer path (a2) which is a different path from the first power transfer path (a1) and through which the input shaft (2) and the output shaft (60) can be coupled to each other during the forward travel. With this configuration, power can be transferred switchably through two paths, namely, the first power transfer path (a1) and the second power transfer path (a2). Thus, appropriate travel that matches the situation such as the travel direction and the travel speed can be achieved.

In the hydraulic control device (12) for the automatic transmission (10) according to the present embodiment, in addition, the automatic transmission (10) includes a forward/reverse switching device (3) that transfers rotation with a rotational direction switched in accordance with a travel direction of the vehicle (1), and a continuously variable speed change mechanism (4) that is capable of continuously changing a speed ratio; and the first power transfer path (a1) couples the input shaft (2) and the output shaft (60) via the forward/reverse switching device (3), and the second power transfer path (a2) couples the input shaft (2) and the output shaft (60) to each other via the continuously variable speed change mechanism (4). With this configuration, the hydraulic control device (12) can be applied to the automatic transmission (10) which utilizes the continuously variable speed change mechanism (4).

In the hydraulic control device (12) for the automatic transmission (10) according to the present embodiment, in addition, the forward/reverse switching device (3) includes a forward engagement element (C1) that forms a path for transfer of rotation in a forward direction of the vehicle (1) when the forward engagement element (C1) is engaged, and a reverse engagement element (B1) that forms a path for transfer of rotation in a reverse direction of the vehicle (1) when the reverse engagement element (B1) is engaged; and the engagement element (B1) is the reverse engagement element (B1). With this configuration, both the meshing clutch (D1) and the reverse engagement element (B1) are engaged in the reverse range, and the meshing clutch (D1) and the reverse engagement element (B1) can be engaged concurrently even in such a case.

In the hydraulic control device (12) for the automatic transmission (10) according to the present embodiment, in addition, the continuously variable speed change mechanism (4) includes a primary pulley (41) that is supplied with a primary pulley pressure to adjust the speed ratio, and a secondary pulley (42) that is supplied with a secondary pulley pressure to regulate a holding pressure; the second solenoid valve (SLS) is a solenoid valve that regulates the secondary pulley pressure; and the resisting pressure (Pb) is a secondary control pressure (PSLS) supplied from the second solenoid valve (SLS). With this configuration, the secondary control pressure (PSLS) which is supplied from the secondary linear solenoid valve is used as the resisting pressure (Pb). Thus, even if the secondary control pressure (PSLS) is varied during reverse travel, the holding pressure for the belt (43) is merely varied, and the travel itself is not affected significantly. In addition, there is no need to provide a new solenoid valve, and thus an increase in number of components can be suppressed.

In the hydraulic control device (12) for the automatic transmission (10) according to the present embodiment, in addition, the range pressure supply section (21) is a manual valve (21) that has a spool (21p) mechanically coupled to a shift lever (13), a position of the spool (21p) being switchable in accordance with an operation of the shift lever (13). With this configuration, the switching valve (27) can be maintained in the non-reverse state by supplying the resisting pressure (Pb) from the second solenoid valve (SLS) before the switching valve (27) is switched to the reverse state even if there is a time lag between the timing of switching of the switching valve (27) by the actual output of the reverse range pressure (PR) and the timing of switching of the shift position of the shift lever (13) by the ECU. In addition, the timings of switching of the switching valve (27) to the reverse state and supply of the engagement pressure (PSLG) from the first solenoid valve (SLG) can be caused to coincide with each other within the second set time (T2) even if there is such a time lag as discussed above. Consequently, disengagement of the meshing clutch (D1) and abrupt engagement of the engagement element (31) at the time of switching of the switching valve (27) can be suppressed.

In the hydraulic control device (12) for the automatic transmission (10) according to the present embodiment, in addition, the automatic transmission (10) includes a range detection sensor (14) that detects a travel range by detecting a position of a shift lever (13); and the switching valve (27) is maintained in the non-reverse state by supplying the resisting pressure (Pb) from the second solenoid valve (SLS) when a vehicle speed is equal to or more than a first threshold (SP1) and it is no longer detected that the travel range is a non-travel range. With this configuration, the switching valve (27) can be maintained in the non-reverse state before supply of the reverse range pressure (PR) in the case where the reverse range pressure (PR) is supplied from the range pressure supply section (21) during a period since the travel range is no longer the non-travel range until the travel range is switched to the reverse range. Consequently, switching of the switching valve (27) to the reverse state can be reliably prevented.

In the hydraulic control device (12) for the automatic transmission (10) according to the present embodiment, in addition, the switching valve (27) is no longer maintained in the non-reverse state by reducing the resisting pressure (Pb) from the second solenoid valve (SLS) when the vehicle speed is equal to or more than the first threshold (SP1) and it is detected that the travel range is a forward range with the switching valve (27) maintained in the non-reverse state. With this configuration, the reverse range pressure (PR) is not supplied from the range pressure supply section (21) when it is detected that the travel range pressure is the forward range. Thus, the switching valve (27) is not switched to the reverse state even if the switching valve (27) is no longer maintained in the non-reverse state. Therefore, it is not necessary to supply the resisting pressure (Pb) for maintaining the switching valve (27) in the non-reverse state, which improves the fuel efficiency.

In the hydraulic control device (12) for the automatic transmission (10) according to the present embodiment, in addition, the meshing clutch (D1) is brought into the engaged state using the engagement pressure (PSLG) which is supplied from the first solenoid valve (SLG) while a vehicle speed is more than a first threshold (SP1) and less than a second threshold (SP2) that is more than the first threshold (SP1) and the switching valve (27) is maintained in the non-reverse state by supplying the resisting pressure (Pb) from the second solenoid valve (SLS). With this configuration, the response at the time when a transition is made to a travel mode that utilizes the meshing clutch (D1) can be enhanced by bringing the meshing clutch (D1) into the engaged state. In addition, the vehicle is traveling at a low to middle speed with the vehicle speed less than the second threshold (SP2). Thus, a large difference in rotation is less likely to occur in the first power transfer path (a1) even if the meshing clutch (D1) is engaged during travel, which can suppress wear and a reduction in life of constituent members of the first power transfer path (a1).

In the hydraulic control device (12) for the automatic transmission (10) according to the present embodiment, in addition, the meshing clutch (D1) is brought into a disengaged state by reducing the engagement pressure (PSLG) from the first solenoid valve (SLG) while a vehicle speed is equal to or more than a second threshold (SP2) that is more than a first threshold (SP1) and the switching valve (27) is maintained in the non-reverse state by supplying the resisting pressure (Pb) from the second solenoid valve (SLS). With this configuration, the vehicle is traveling at a high speed with the vehicle speed equal to or more than the second threshold (SP2). Thus, occurrence of a large difference in rotation in the first power transfer path (a1) can be suppressed by engaging the meshing clutch (171) during travel. Consequently, wear and a reduction in life of constituent members due to a large difference in rotation in the first power transfer path (a1) can be suppressed.

In the hydraulic control device (12) for the automatic transmission (10) according to the present embodiment, in addition, the meshing clutch (D1) is brought into the engaged state using the engagement pressure (PSLG) which is supplied from the first solenoid valve (SLG) in the case where the vehicle speed is less than the second threshold (SP2) when the meshing clutch (D1) is brought into the disengaged state by reducing the engagement pressure (PSLG) from the first solenoid valve (SLG). With this configuration, the response at the time when a transition is made to a travel mode that utilizes the meshing clutch (D1) can be enhanced since the meshing clutch (D1) is switched from the disengaged state to the engaged state.

In the hydraulic control device (12) for the automatic transmission (10) according to the present embodiment, in addition, in the case where a vehicle speed is less than a first threshold (SP1) when the switching valve (27) is maintained in the non-reverse state, the resisting pressure (Pb) from the second solenoid valve (SLS) is reduced and the engagement pressure (PSLG) from the first solenoid valve (SLG) is reduced, and the engagement element (B1) is engaged using the engagement pressure (PSLG) from the first solenoid valve (SLG) after a lapse of a first set time (T1). With this configuration, the timings of switching of the switching valve (27) to the reverse state and supply of the engagement pressure (PSLG) from the first solenoid valve (SLG) can be caused to coincide with each other within the first set time (T1). Consequently, disengagement of the meshing clutch (D1) and abrupt engagement of the engagement element (B1) at the time of switching of the switching valve (27) can be suppressed while reducing the number of solenoid valves.

In the hydraulic control device (12) for the automatic transmission (10) according to the present embodiment, in addition, when a travel range is switched from a non-reverse range to a reverse range, the switching valve (27) is maintained in the non-reverse state by supplying the resisting pressure (Pb) from the second solenoid valve (SLS), thereafter the engagement pressure (PSLG) from the first solenoid valve (SLG) is reduced and the resisting pressure (Pb) from the second solenoid valve (SLS) is reduced, the switching valve (27) is switched to the reverse state within a second set time (T2), and the engagement element (B1) is engaged using the engagement pressure (PSLG) from the first solenoid valve (SLG) after a lapse of the second set time (T2). With this configuration, the switching valve (27) is maintained in the non-reverse state by supplying the resisting pressure (Pb) from the secondary solenoid valve (SLS) when the travel range is switched from the non-reverse range to the reverse range, and thereafter the timings of switching of the switching valve (27) to the reverse state and supply of the engagement pressure (PSLG) from the first solenoid valve (SLG) can be caused to coincide with each other within the second set time (T2). Consequently, disengagement of the meshing clutch (D1) and abrupt engagement of the engagement element (B1) at the time of switching of the switching valve (27) can be suppressed while reducing the number of solenoid valves.

In the hydraulic control device (12) for the automatic transmission (10) according to the present embodiment, in addition, when the travel range is switched from the non-reverse range to the reverse range, the switching valve (27) is maintained in the non-reverse state by supplying the resisting pressure (Pb) from the second solenoid valve (SLS) when the non-reverse range is turned off, and the engagement pressure (PSLG) from the first solenoid valve (SLG) is reduced and the resisting pressure (Pb) from the second solenoid valve (SLS) is reduced after a lapse of a third set time (T3) since a time when the reverse range is turned on. With this configuration, a hydraulic pressure supplied from the second solenoid valve (SLS) can be sufficiently raised, and thus the switching valve (27) can be reliably maintained in the non-reverse state.

In the hydraulic control device (12) for the automatic transmission (10) according to the present embodiment, in addition, the meshing clutch (D1) has an urging portion (59) that maintains the engaged state when the engagement pressure (PSLG) is supplied, and that switches the meshing clutch (D1) to a disengaged state when the engagement pressure (PSLG) is not supplied; and when the travel range is switched from the non-reverse range to the reverse range, the switching valve (27) is maintained in the non-reverse state by supplying the resisting pressure (Pb) from the second solenoid valve (SLS), and thereafter the engagement pressure (PSLG) from the first solenoid valve (SLG) is reduced to a synchronization holding pressure (Pc) that is more than an urging force of the urging portion (59) and less than a hydraulic pressure at which engagement of the engagement element (B1) is started and that keeps the meshing clutch (D1) in the engaged state. With this configuration, the engagement pressure (PSLG) at the synchronization holding pressure (Pc) is output from the first solenoid valve (SLG). Therefore, the synchronization holding pressure (Pc) is supplied to the engagement element (B1) when the switching valve (27) is switched to the reverse state. Since the synchronization holding pressure (Pc) is lower than the engagement pressure for the engagement element (B1), however, abrupt engagement of the engagement element (B1) can be suppressed. Moreover, with the presence of the urging portion (59), the meshing clutch (D1) is brought into the disengaged state when the drive source (16) is stopped, and thus the vehicle (1) can be towed easily, for example, compared to a case where the meshing clutch (D1) is in the engaged state.

In the hydraulic control device (12) for the automatic transmission (10) according to the present embodiment, in addition, the automatic transmission (10) has a mechanical oil pump (18) driven by the drive source (16); and the engagement pressure (PSLG) from the first solenoid valve (SLG) is reduced and the resisting pressure (Pb) from the second solenoid valve (SLS) is reduced after a rotational speed of the drive source (16) becomes more than a threshold when the drive source (16) is started. With this configuration, a discharge pressure from the mechanical oil pump (18) can be utilized as the source pressure after becoming sufficiently high after the drive source (16) is restarted in the case where idle of the drive source (16) is stopped and the mechanical oil pump (18) is stopped, which can secure the stability of hydraulic control.

In the hydraulic control device (12) for the automatic transmission (10) according to the present embodiment, in addition, when the travel range is switched from the reverse range to the non-reverse range, the resisting pressure (Pb) is supplied from the second solenoid valve (SLS), the switching valve (27) is switched to the non-reverse state within a non-reverse switching time (T4) since supply of the resisting pressure (Pb), and the engagement pressure (PSLG) which is supplied from the first solenoid valve (SLG) is supplied to the meshing clutch (D1) after a lapse of the non-reverse switching time (T4). With this configuration, the timings of switching of the switching valve (27) to the non-reverse state and supply of the engagement pressure (PSLG) from the first solenoid valve (SLG) can be caused to coincide with each other within the non-reverse switching time (T4). Consequently, unnecessary disengagement of the meshing clutch (D1) and abrupt engagement of the engagement element (B1) at the time of switching of the switching valve (27) can be suppressed.

INDUSTRIAL APPLICABILITY

The hydraulic control device for an automatic transmission can be used for an automatic transmission that has a meshing clutch with a synchronization mesh mechanism, and is suitably used for an automatic transmission for which it is desired to suppress disengagement of the meshing clutch and abrupt engagement of an engagement element in the case where a shift lever is switched to a reverse range during forward travel.

The invention claimed is:

1. A hydraulic control device for an automatic transmission which includes:
    an input shaft drivably coupled to a drive source of a vehicle;
    an output shaft drivably coupled to wheels;
    a power transfer path that couples the input shaft and the output shaft to each other;
    a meshing clutch with a synchronization mesh mechanism that is provided in the power transfer path and that allows power transfer when supplied with a hydraulic pressure; and
    an engagement element that is provided in the power transfer path and that allows power transfer with rotation from the input shaft reversed when supplied with a hydraulic pressure,
    the automatic transmission being configured to transfer rotation by connecting the input shaft and the output shaft to each other through the power transfer path when the meshing clutch and the engagement element are brought into an engaged state, and the hydraulic control device being configured to supply and discharge a hydraulic pressure to and from the meshing clutch and the engagement element, the hydraulic control device comprising:
    a source pressure generator that generates a source pressure;
    a range pressure supplier that supplies a reverse range pressure in the case where a shift speed is a reverse speed;
    a first solenoid valve that is capable of supplying an engagement pressure for engagement of the meshing clutch or the engagement element;
    a switching valve that is switchable in accordance with the reverse range pressure, the switching valve being switched to a non-reverse state in which the engagement pressure which is supplied from the first solenoid valve is supplied to the meshing clutch and a hydraulic pressure in the engagement element is drained in the case where the reverse range pressure is not supplied, and switched to a reverse state in which the engagement pressure which is supplied from the first solenoid valve is supplied to the engagement element and the source pressure is supplied to the meshing clutch in the case where the reverse range pressure is supplied; and
    a second solenoid valve that is capable of supplying a resisting pressure that maintains the switching valve in the non-reverse state against the reverse range pressure, wherein
    the switching valve is maintained in the non-reverse state by supplying the resisting pressure from the second solenoid valve while a travel range is switched to at least a reverse range during forward travel.

2. The hydraulic control device for an automatic transmission according to claim 1, wherein
    the power transfer path has a first power transfer path in which the meshing clutch and the engagement element are provided and through which the input shaft and the output shaft are allowed to be coupled to each other during forward travel and reverse travel, and a second power transfer path which is a different path from the first power transfer path and through which the input shaft and the output shaft are allowed to be coupled to each other during the forward travel.

3. The hydraulic control device for an automatic transmission according to claim 2, wherein:
    the automatic transmission includes a forward/reverse switching device that transfers rotation with a rotational direction switched in accordance with a travel direction of the vehicle, and a continuously variable speed change mechanism that is capable of continuously changing a speed ratio; and
    the first power transfer path couples the input shaft and the output shaft via the forward/reverse switching device, and the second power transfer path couples the input shaft and the output shaft to each other via the continuously variable speed change mechanism.

4. The hydraulic control device for an automatic transmission according to claim 3, wherein:
    the forward/reverse switching device includes a forward engagement element that forms a path for transfer of rotation in a forward direction of the vehicle when the forward engagement element is engaged, and a reverse engagement element that forms a path for transfer of rotation in a reverse direction of the vehicle when the reverse engagement element is engaged; and the engagement element is the reverse engagement element.

5. The hydraulic control device for an automatic transmission according to claim 4, wherein:

the continuously variable speed change mechanism includes a primary pulley that is supplied with a primary pulley pressure to adjust the speed ratio, and a secondary pulley that is supplied with a secondary pulley pressure to regulate a holding pressure;

the second solenoid valve is a solenoid valve that regulates the secondary pulley pressure; and the resisting pressure is a secondary control pressure supplied from the second solenoid valve.

6. The hydraulic control device for an automatic transmission according to claim 5, wherein the range pressure supplier is a manual valve that has a spool mechanically coupled to a shift lever, a position of the spool being switchable in accordance with an operation of the shift lever.

7. The hydraulic control device for an automatic transmission according to claim 6, wherein:

the automatic transmission includes a range detection sensor that detects a travel range by detecting a position of a shift lever; and the switching valve is maintained in the non-reverse state by supplying the resisting pressure from the second solenoid valve when a vehicle speed is equal to or more than a first threshold and it is no longer detected that the travel range is a non-travel range.

8. The hydraulic control device for an automatic transmission according to claim 7, wherein the switching valve is no longer maintained in the non-reverse state by reducing the resisting pressure from the second solenoid valve when the vehicle speed is equal to or more than the first threshold and it is detected that the travel range is a forward range with the switching valve maintained in the non-reverse state.

9. The hydraulic control device for an automatic transmission according to claim 8, wherein the meshing clutch is brought into the engaged state using the engagement pressure which is supplied from the first solenoid valve while a vehicle speed is more than a first threshold and less than a second threshold that is more than the first threshold and the switching valve is maintained in the non-reverse state by supplying the resisting pressure from the second solenoid valve.

10. The hydraulic control device for an automatic transmission according to claim 8, wherein the meshing clutch is brought into a disengaged state by reducing the engagement pressure from the first solenoid valve while a vehicle speed is equal to or more than a second threshold that is more than a first threshold and the switching valve is maintained in the non-reverse state by supplying the resisting pressure from the second solenoid valve.

11. The hydraulic control device for an automatic transmission according to claim 10, wherein the meshing clutch is brought into the engaged state using the engagement pressure which is supplied from the first solenoid valve in the case where the vehicle speed is less than the second threshold when the meshing clutch is brought into the disengaged state by reducing the engagement pressure from the first solenoid valve.

12. The hydraulic control device for an automatic transmission according to claim 11, wherein in the case where a vehicle speed is less than a first threshold when the switching valve is maintained in the non-reverse state, the resisting pressure from the second solenoid valve is reduced and the engagement pressure from the first solenoid valve is reduced, and the engagement element is engaged using the engagement pressure from the first solenoid valve after a lapse of a first set time.

13. The hydraulic control device for an automatic transmission according to claim 12, wherein when a travel range is switched from a non-reverse range to a reverse range, the switching valve is maintained in the non-reverse state by supplying the resisting pressure from the second solenoid valve, then the engagement pressure from the first solenoid valve is reduced and the resisting pressure from the second solenoid valve is reduced, the switching valve is switched to the reverse state within a second set time, and the engagement element is engaged using the engagement pressure from the first solenoid valve after a lapse of the second set time.

14. The hydraulic control device for an automatic transmission according to claim 13, wherein when the travel range is switched from the non-reverse range to the reverse range, the switching valve is maintained in the non-reverse state by supplying the resisting pressure from the second solenoid valve when the non-reverse range is turned off, and the engagement pressure from the first solenoid valve is reduced and the resisting pressure from the second solenoid valve is reduced after a lapse of a third set time since a time when the reverse range is turned on.

15. The hydraulic control device for an automatic transmission according to claim 14, wherein:

the meshing clutch has an urging portion that maintains the engaged state when the engagement pressure is supplied, and that switches the meshing clutch to a disengaged state when the engagement pressure is not supplied; and when the travel range is switched from the non-reverse range to the reverse range, the switching valve is maintained in the non-reverse state by supplying the resisting pressure from the second solenoid valve, and then the engagement pressure from the first solenoid valve is reduced to a synchronization holding pressure that is more than an urging force of the urging portion and less than a hydraulic pressure at which engagement of the engagement element is started and that keeps the meshing clutch in the engaged state.

16. The hydraulic control device for an automatic transmission according to claim 15, wherein:

the automatic transmission has a mechanical oil pump driven by the drive source; and the engagement pressure from the first solenoid valve is reduced and the resisting pressure from the second solenoid valve is reduced after a rotational speed of the drive source becomes more than a threshold when the drive source is started.

17. The hydraulic control device for an automatic transmission according to claim 16, wherein when the travel range is switched from the reverse range to the non-reverse range, the resisting pressure is supplied from the second solenoid valve, the switching valve is switched to the non-reverse state within a non-reverse switching time since supply of the resisting pressure, and the engagement pressure which is supplied from the first solenoid valve is supplied to the meshing clutch after a lapse of the non-reverse switching time.

\* \* \* \* \*